US 12,405,068 B2

(12) United States Patent
Maddali

(10) Patent No.: US 12,405,068 B2
(45) Date of Patent: Sep. 2, 2025

(54) ENERGY CONVERSION, STORAGE AND RETRIEVAL DEVICE AND METHOD

(71) Applicant: Venkata Vijay Kumar Maddali, Somerville (AU)

(72) Inventor: Venkata Vijay Kumar Maddali, Somerville (AU)

(73) Assignee: ESYANTRA PTY LTD., Somerville (AU)

(*) Notice: Subject to any disclaimer, the term of this patent is extended or adjusted under 35 U.S.C. 154(b) by 622 days.

(21) Appl. No.: 17/440,631

(22) PCT Filed: Mar. 18, 2020

(86) PCT No.: PCT/AU2020/050257
§ 371 (c)(1),
(2) Date: Sep. 17, 2021

(87) PCT Pub. No.: WO2020/186303
PCT Pub. Date: Sep. 24, 2020

(65) Prior Publication Data
US 2022/0155027 A1    May 19, 2022

(30) Foreign Application Priority Data
Mar. 18, 2019 (AU) .............. 2019110104555

(51) Int. Cl.
*F28D 20/00* (2006.01)
*F27B 14/10* (2006.01)
(Continued)

(52) U.S. Cl.
CPC ............ *F28D 20/021* (2013.01); *F27B 14/10* (2013.01); *F28F 21/04* (2013.01)

(58) Field of Classification Search
CPC ......... F28D 2020/0004; F28D 20/0034; F28D 2020/0065; F28D 2020/0069;
(Continued)

(56) References Cited

U.S. PATENT DOCUMENTS 5,854,155 A * 12/1998 Kawasaki ............. C04B 35/583
                                                    524/404
2009/0255660 A1* 10/2009 Cornie .................... F28F 13/14
                                                    165/185
(Continued)

FOREIGN PATENT DOCUMENTS

AU    2012292959 B2    2/2013
WO    2011/017767 A1   2/2011
(Continued)

OTHER PUBLICATIONS

International Searching Authority—International Search Report—International Application No. PCT/AU2020/050257, dated Jun. 15, 2020, together with the Written Opinion of the International Searching Authority, 13 pages.

(Continued)

*Primary Examiner* — Frantz F Jules
*Assistant Examiner* — Jason N Thompson
(74) *Attorney, Agent, or Firm* — Barclay Damon LLP

(57) ABSTRACT

An energy conversion, storage and retrieval device and method, comprising: a susceptor crucible encased in a thermal housing, the susceptor crucible having a bottom wall and one or more side walls extending upwardly from the bottom wall, therein defining a crucible interior which contains a thermal energy storage material; a heat generator powered by an electrical energy source and positioned in close proximity to an outside of the side wall of the crucible so as to be able to heat the energy storage material; a regulated fluid flow circuit in the housing that circulates fluid from a fluid circuit inlet, that is heated and circulated to a fluid circuit outlet as heated fluid; wherein when heated, the energy storage material stores thermal energy, and wherein the thermal energy can be retrieved by conduction (Continued)

through the crucible side wall and into the fluid flow circuit thereby heating the fluid therein.

13 Claims, 20 Drawing Sheets

(51) Int. Cl.
*F28D 20/02* (2006.01)
*F28F 21/04* (2006.01)

(58) Field of Classification Search
CPC .... F28D 2020/0078; F02G 1/043–1/05; F02G 2254/40–2254/45; Y02E 10/46; Y02E 60/14
See application file for complete search history.

(56) References Cited

U.S. PATENT DOCUMENTS

| | | | | |
|---|---|---|---|---|
| 2013/0146000 A1* | 6/2013 | Choi | ..................... | F28D 20/028 123/41.14 |
| 2014/0147801 A1* | 5/2014 | Yasuda | ................... | F27B 14/10 432/265 |
| 2014/0366536 A1* | 12/2014 | Muren | ..................... | F03G 6/00 126/618 |
| 2016/0178284 A1* | 6/2016 | Bataille | .................. | F25B 35/04 165/104.12 |
| 2016/0209124 A1* | 7/2016 | Da Silvaa | ............... | C01B 32/16 |
| 2016/0223268 A1* | 8/2016 | Quast | .................. | F28D 20/0056 |
| 2017/0194548 A1* | 7/2017 | Wakino | .................. | H10N 10/82 |

FOREIGN PATENT DOCUMENTS

| | | | | |
|---|---|---|---|---|
| WO | WO-2015132305 A1 * | 9/2015 | ............. | F28D 20/02 |
| WO | WO-2017173499 A1 * | 10/2017 | ........... | F28D 20/021 |
| WO | 2018/104896 A1 | 6/2018 | | |
| WO | 2018/170533 A1 | 9/2018 | | |
| WO | 2019/034980 A1 | 2/2019 | | |

OTHER PUBLICATIONS

International Preliminary Examining Authority—International Preliminary Report on Patentability—International Application No. PCT/AU2020/050257, dated Jul. 1, 2021, 7 pages.

* cited by examiner

FIG. 6 Section-CC

ENERGY CONVERSION, STORAGE AND RETRIEVAL DEVICE AND METHOD

CROSS-REFERENCE TO RELATED APPLICATIONS

This application is the national phase entry of International Patent Application No. PCT/AU2020/050257 filed on Mar. 18, 2020, and claims the benefit of Australian Patent Application No. 201911010455 filed Mar. 18, 2019, the disclosures of which are incorporated herein by reference in their entirety.

FIELD

The present application relates generally to the fields of furnace technology, metal melting, material sciences, gas properties, heat engines and more particularly to a device and method of electrical energy conversion, thermal energy storage and thermal energy retrieval that can be used by an energy recovery device.

BACKGROUND

This section is intended to introduce various aspects of the art, which may be associated with aspects of the disclosed techniques and methodologies.

Production of electricity from conventional sources like coal, oil, gas and biomass have always proved to be inefficient as only some of the modern plants can achieve 45% conversion efficiency compared to the majority of power plants that operate at an efficiency of anywhere between 20% to 30% depending on the age of the plant. Only a fraction of the energy in the fossil fuel is converted to electrical output, typically about 30%. Furthermore, these sources are considered unclean and there is great momentum to move away from such conventional sources of electricity production and towards clean sources.

To add to the above shortcomings, a significant portion of the balance of the energy (approximately 60%) ends up as heat that is rejected to the ambience. Nearly two-thirds of the energy used by conventional electricity generation is wasted in the form of heat discharged to the atmosphere. Additional energy is wasted during the distribution of electricity to end users. By capturing and using heat that would otherwise be wasted, and by avoiding distribution losses, Combined heat and power (CHP) can achieve efficiencies of over 80 percent, compared to 30 percent for typical technologies (i.e., conventional electricity generation and an on-site boiler).

Combined heat and power (CHP) systems also known as cogeneration denotes a system that uses fuel, usually gas, to generate electricity and usable heat. The system includes the generator and pumps for the transport of heat from the system to the building systems, but excludes the supplementary boilers used to boost heat outputs from the cogeneration system. Loss of energy in any process is always unavoidable. In the case of CHP, a high process efficiency that is in excess of 80% is claimed but what is not highlighted about CHP technology as we know them is that the electrical efficiency of both the CHP and fossil fired power plants are around the 30% mark.

CHP is an energy efficient technology that generates electricity and heat (that would otherwise be wasted). The heat generated can be used for applications such as space heating, domestic hot water and industrial processes. A CHP device is typically located at facilities where there is a need for both electricity and thermal energy. The two most common CHP system configurations are Combustion turbine, or reciprocating engine, with heat recovery unit and Steam boiler with steam turbine. The Combustion turbine or reciprocating engine CHP systems burn fuel (natural gas, oil, or biogas) to turn generators to produce electricity and use heat recovery devices to capture the heat from the turbine or engine. This heat is converted into useful thermal energy, usually in the form of steam or hot water. In the case of steam turbines, the process begins by producing steam in a boiler. The steam is then used to turn a turbine to run a generator to produce electricity. The steam leaving the turbine can be used to produce useful thermal energy. These systems can use a variety of fuels, such as natural gas, oil, biomass, and coal, albeit all of them are fossil fuels.

The typical disadvantages of CHP devices is that almost all of the CHP systems use some type of fossil fuel that requires burning. The result of burning is $CO_2$ emissions, which are proven to be catastrophic to the atmosphere resulting in climate change and global warming. CHP is more a means of making other energy sources more efficient rather than an intrinsic energy source. It does not use renewable energy sources and it is only suitable for use where both hot water and electricity are needed, and at consistently high and sustained levels. CHP systems are considered to not be suitable long term solutions to sustainable energy production because they are based on fossil fuel technology.

It is also evident that none of the CHP technologies are clean. Neither do they seem to have a method of employing renewable energy sources as a source of energy given that CHP technologies rely on combustible fuels to generate energy.

If renewable energies are to be pursued energy storage systems are a necessity as the availability of renewable energy sources such as solar and wind are unreliable, unpredictable and are intermittent in nature. Electrical and chemical storage devices have been used with some success but have their drawbacks including high capital cost, short workable lives and complexity in up-scaling. Thermal energy storage devices have drawn some attention. Thermal energy devices rely on storing and retrieving latent heat generated in a thermal energy storage material that typically undergoes a phase change, such as solid to liquid. Such materials are known as phase change materials (PCM).

Silicon is a popular PCM which is considered as high temperature energy storage medium. Crucibles are used in holding and melting Silicon and are often graphite or silicon nitride based. However, problems are experienced with thermal energy devices as the crucible cools to room temperature. The solid silicon can exert significant pressure on the crucible that eventually leads to the cracking of the crucible. It is for this reason that the silicon melting and fabrication industry prefers to keep the silicon molten in the crucible than letting it cool down. Where the silicon is allowed to cool the crucibles are cracked open to release the silicon ingot. Alternatively, if the material and construction of a crucible is able to withstand the pressure of silicon cooling, the thermal conductivity of that crucible is mostly likely compromised and unsatisfactory for transferring heat out of the crucible at levels suitable for other applications.

WO2018104896 discloses an apparatus for storing and retrieving thermal energy by employing a phase change material (PCM) comprises thermally conductive units, energy sources for providing thermal energy to a PCM, an inert gas system, insulation layers and outer enclosure member. The conductive unit has trench(es) for holding the PCM. The trench has opposing significantly curved longitudinal walls and side walls meeting at a base thereby having a greater internal pressure withstanding capacity. In some embodiments, the conductive units are configured to maximise the volume ratio of the PCM to conductive material. In one embodiment, the trench is partially elliptical in a planar cross section that is perpendicular to a major axis or a minor axis of the trench. The apparatus is in thermal contact with a thermal energy conversion system for transferring retrieved thermal energy to thermal energy conversion system that converts retrieved thermal energy into electrical energy.

AU2012292959 discloses a thermal energy storage apparatus, including: a block of a heat-absorbing material, and a plurality of heat storage elements, the heat storage elements including a phase change material is stored in a containment vessel; wherein each heat storage element is in thermal contact with the block of heat-absorbing material.

However, the apparatus described in the above prior art suffer from several drawbacks that impact on the longevity of the apparatus and in some cases will only work for a short period of time. One of the major problems include cracking of the vessels that hold the heat absorbing material as the material cools so the vessels cannot be reused. Another problem is that the apparatus produces uncontrolled amounts of heat flux on which bears on the heat recovery device, often a Stirling engine, causing damage to the heat recovery device beyond repair.

It would be beneficial to use the benefits associated with thermal energy storage systems to utilizes renewable energy or the energy from traditional sources store such energy in the form of heat and subsequently convert the same to electrical and thermal output in a manner that is sustainable, cost effective, and with improved efficiency.

SUMMARY

In accordance with the present invention there is provided an energy conversion, storage and retrieval device, comprising:
- a susceptor crucible encased in a thermal housing, the susceptor crucible having a bottom wall and one or more side walls extending upwardly from the bottom wall, therein defining a crucible interior which contains a thermal energy storage material;
- a heat generator powered by an electrical energy source and positioned in close proximity to an outside of the side wall of the crucible so as to be able to heat the energy storage material;
- a regulated fluid flow circuit in the housing that circulates fluid from a fluid circuit inlet that is heated and circulated to a fluid circuit outlet as heated fluid;
- wherein when heated, the energy storage material stores thermal energy, and wherein the thermal energy can be retrieved by conduction through the crucible side wall and into the fluid flow circuit thereby heating the fluid therein.

It is desirable that the heat source (crucible) in the device and a heat recovery system drawing heat from the fluid circuit outlet (usually a heat exchanger or the hot head of a heat engine which receives the heated fluid) are in physical isolation in order to prevent any physical damage to the heat exchanger due to over-exposure to heat or radiation and lack of temperature control of the energy transfer to the heat exchanger. These problems are mitigated in the present device by the provision of the regulated fluid flow circuit, preferably a gas loop, that isolates any heat recovery system at the fluid circuit outlet from direct radiation and transfers energy from the crucible to the ultimate destination at the fluid circuit outlet, usually a heat exchanger.

Preferably, the crucible is made of a material having a coefficient of thermal expansion (CTE) that is less than the CTE of the energy storage material across a temperature range of 25-1500° C. A crucible with a lower CTE is much less likely to crack and be damaged by the thermal energy storage material (especially silicon) as it cools and expands. The CTE of the crucible material may be less than $3\times10^{-6}$ $C^{-1}$, and optionally less than 2, and preferably between $-0.72$ and $1.\times10^{-6}$ $C^{-1}$ at 25-1500° C.

An advantage of having the material of the receptor crucible having a CTE that is lower than that of the energy storage material is that the crucible can store energy in the thermal energy storage material while accommodating and withstanding the volumetric transformation of the thermal energy storage material, which is a phase change material (PCM), as the PCM undergoes phase change from room temperature to its melting temperature and vice versa. This is because while the PCM heats it becomes softer and volumetrically expands about 10% towards the rim of the crucible and on being cooled the crucible contracts at a rate that is lower than that of the PCM thereby relieving pressure buildup.

In a preferred embodiment the crucible material has the required thermal properties to conduct the thermal energy both while the device is getting charged and discharged. A further preference is that the inner walls of the crucible are non-wetting to the PCM at its melting point.

The susceptor crucible holds the phase change material (PCM) and functions as a heat source that transmits energy received by it to the PCM that it holds. The crucible also functions as a device that allows the thermal energy stored in the PCM to be transferred to the energy carrier fluid, preferably a gas, through the crucible's exterior walls. In the case of storing energy in the PCM, induction heating can be employed to heat the susceptor crucible. The susceptor crucible is heated first either directly or indirectly and subsequently transfers the thermal energy to the PCM via conduction and or radiation. The susceptor crucible comprises an outer surface of the side wall that acts as one or more of the walls of the hot gas channel in the fluid circuit that preferably surrounds the crucible.

In one embodiment the crucible material is from a group of materials having a very low or a negative CTE at 25° C. A 'very low' CTE is considered to be a CTE close to being negative but not quite negative. Specifically, materials having a CTE of between 0 and $3\times10^{-6}$ $C^{-1}$ are considered to have very low CTEs. Materials having a negative CTE will have, as the term suggests, a CTE of less than zero. Furthermore, it is preferred that the crucible is made of a material having a thermal conductivity of more than 100-750 W/mK at a temperature of 25° C.

In an embodiment of the invention the crucible material includes a polymorphic form of boron nitride in the amount of between 50%-100% by mass, and preferably 70%-100% by mass, with the remaining 0%-50% by mass consisting of ceramics and/or metals. Such forms of polymorphic boron nitride include a-BN, h-BN, t-BN, r-BN, m-BN, o-BN, w-BN, PcBN and c-BN. In a preferred embodiment the material is h-BN (hexagonal boron nitride).

In one embodiment the crucible material may be made of a combination of any one or more of polymorphic forms of boron nitride with the addition of a ceramic powder, such as silicon nitride, aluminium nitride and the like, where the ceramic powder would need to withstand melting temperatures greater than 2000° C. Ceramic powder may be present in the proportion of more than 0% to 50% by mass with the remainder comprising boron nitride.

In yet another embodiment the crucible material may be made of a combination of any one or more of polymorphic forms of boron nitride with the addition of a metallic powder in the proportion of 0% to 50% by mass, where the metallic powder would need to withstand melting temperatures greater than 2000° C.

Alternatively still, the crucible material could be a combination of polymorphic forms of boron nitride, ceramic powders and metallic powders.

The susceptor crucible is thermally insulated all around by the thermal housing. As discussed above, the crucible material can be selected from a group of nitride-based ceramic material, and preferably a nitride-based ceramic material that has a melting point higher than 1800° C. and preferably higher than 2000° C. and a coefficient of thermal expansion that is lower than that of the PCM across the temperature range of 25-1500° C. In a preferred embodiment the crucible material is hexagonal boron nitride.

Other materials may also be suitable for use as the crucible material. For example, a silicone nitride composite could form an acceptable crucible having the ability to withstand the pressure of a cooling PCM yet achieve good conductivity. It is envisaged that there could be a number of materials having negative or significantly low coefficients of thermal expansion (namely between 0 and $3 \times 10^{-6}$° $C.^{-1}$) that could be mixed with a ceramic base to form a suitable crucible material. Such materials with a significantly lower CTE could include artificial diamond powder, poly crystalline diamond powder and could be mixed with ceramics including silicon nitride, aluminium nitride and the like.

The susceptor crucible should also preferably non wetting to the PCM with a contact angle that is more than 90° and taper outwardly from the bottom wall. In one embodiment the susceptor crucible comprises four walls that extend at an angle of 91 to 145° relative to the bottom wall, or base, of the crucible so as to form an inverted pyramid that serves two functions: (i) to optimize the PCM storage volume and (ii) to provide non wetting angle to the PCM. These functions increase both the energy density and the life of the crucible as compared to other crucible shapes and angles. One or more susceptor crucibles of varying widths may be placed next to each other and/or on top of each other, each holding a separate amount of phase change material. For better efficiencies there are preferably multiple silicon-containing crucibles with multiple fluid flow circuits circulating around the crucibles.

The phase change material is a poor conductor in solid state and a good conductor in liquid state. The phase change material is heated by way of conduction and radiation. The majority of the first melt is by way of conduction through the susceptor crucible to the phase change material followed by radiation. In a preferred embodiment the phase change material contains silicon.

In one embodiment the PCM may consist of silicon. Alternatively, the PCM could be a silicon mixture, or non-homogenous material, whereby the silicon mixture comprises silicon as the base material and includes additives to improve the mixture's performance. For example, additives to the silicon base could include silicon carbide fragments, graphite fragments, boron fragments, or a combination of these or similar materials depending on the objective to be achieved. Boron, for example, when mixed with silicon reduces the mixture's expansion rate during solidification and assists in thermal retention capacity of the mixture. Silicon carbide and graphite fragments would increase the heat transfer properties in the mixture during induction heating. An ideal desired balance in properties may be achieved by fine tuning the proportions of additives used. It is envisaged that a silicon mixture would comprise approximately 70 to 95 mass % silicon and 5 to 30 mass % additives.

The fluid flow circuit contains a recirculating energy carrier fluid and can be defined as having a cold fluid channel and a hot fluid channel. In a preferred form, the fluid flow circuit is connectable to an energy recovery system that receives the heated energy carrier fluid from the fluid circuit outlet, transfers heat from the energy carrier fluid and returns cooled fluid to the fluid circuit inlet, thereby forming a closed loop fluid flow circuit. In one embodiment the fluid is a gas.

In one embodiment the thermal housing includes a thermal insulation intermediate component that comprises an induction coil arranged at a very short distance from the crucible and achieves high energy conversion rates of about 85% to the PCM. The induction coils are embedded in the thermal housing and vertically surround at least part each crucible, if not the entire crucible circumference. The arrangement of induction coils within the thermal insulation intermediate and the manner in which plurality of susceptor crucibles are arranged along their length within the thermal insulation intermediate serves dual functions of providing for better thermal insulation of the crucible and also permits the free flow of energy carrier gas. In other words, the induction coils are positioned outwardly of the hot fluid channel relative to the crucible, so that the induction coils surround not only the crucible containing PCM but also the hot fluid channel, which as discussed in more detail below, is located immediately adjacent the outside of the crucible side wall.

The composition of thermal insulation intermediate comprises refractory materials or composites. The thermal insulation intermediate may include an outer wall and one or more side walls and an inner wall (that forms a part of the hot gas channel). The thermal intermediate insulation encapsulates, or encases, the susceptor crucible on all sides except the top. The thermal insulation may also encompass a plurality of susceptor crucibles placed next to each other with one or more heat generators/sources placed near the one or more outer walls of plurality of crucibles in order to maximize the energy transfer.

In an another embodiment, other heat source like, resistive heating elements, heating mesh or the like may be employed to heat the susceptor crucible. Where resistive heating methods are employed as a replacement to induction heating, the thermal insulation intermediate, thermal insulation outer and the outer shell contains provisions such as access, insert openings to receive and position the heat source (heating elements) near or in between the outer side walls of adjacent crucibles.

There may be voids between the inner walls of the thermal insulation intermediate and the outer side walls of the crucible that form the hot fluid (gas) channel. Accordingly, the hot gas channel is positioned horizontally adjacent relative to the crucible. More specifically, the hot fluid channel horizontally may surround at least part of the crucible and fluid flows in an upwardly direction relative to the crucible bottom wall and to the fluid circuit outlet.

As discussed, the outside of the crucible side wall defines a wall of the hot fluid channel thereby permitting heat transfer from the PCM through the crucible and to the carrier fluid. The inner walls of the thermal insulation intermediate are coated with a highly conductive material that facilitates the transfer of heat radiated from the one or more crucibles into the energy carrier gas. The energy carrier gas for heat transfer can be nitrogen or any one of inert gases, such as argon, with good thermal properties such as specific heat capacity and heat transfer rate. The temperature of the outer wall of the thermal insulation intermediate is comparatively colder to the innermost walls. The differential temperature between the outer walls and inner walls facilitates the movement of carrier gas defined by the laws of physics and governed by convection mechanism.

The thermal housing may also include a thermal insulation outer component to achieve additional thermal insulation and to provide a means of recirculating the energy carrier gas. The thermal insulation intermediate is encircled by the thermal insulation outer except at its top (where a thermal insulation top is provided). The voids between the inner walls of the thermal insulation outer and the outer walls of the thermal insulation intermediate form the cold fluid (gas) channel. It is through this cold gas channel that the gas returning back to the hot channel passes before the gas is heated up again to commence the next cycle in the closed loop again. The thermal insulation outer is preferably made of refractory material that is non-permeable to gas.

Put differently, the thermal housing is constructed to define the cold fluid inlet at an upper end of the housing to receive cooled fluid in the cold fluid channel, the cold fluid channel extending downwardly of the housing and re-orienting to extend towards the bottom wall of the crucible and into the hot fluid channel, which extends upwardly on an outside of the crucible wall toward the hot fluid outlet. A valve at the top of the hot fluid channel, and just before or at the outlet, is provided to regulate the flow of heated fluid out of the hot fluid channel.

In another aspect, the device includes a thermal chamber for transferring thermal energy to a heat exchanger or a head of a heat engine. A heat engine head or a heat exchanger housed in the thermal chamber receives the energy transferred from the energy chamber. The thermal chamber is cylindrical and is carried in a thermal insulation top component of the housing. The thermal chamber receives a reciprocally slidable sleeve that is ideally a cylinder with an opening at one end and series of access holes on either end of the cylinder. The sleeve is preferably made of ceramic material for use in applications that demand high structural strength and operation at high temperatures.

The sleeve regulates the power output from the device by controlling the flow of carrier gas into and out of the thermal chamber. The sleeve is operable to slide from fully openable position to fully closed position for regulating the flow of carrier gas to the thermal chamber. Specifically, the access holes open and close across the fluid circuit inlet and outlet thereby acting as a valve controlling fluid flow between the thermal chamber and the fluid flow circuit. The sleeve is controlled by suitable mechanisms provided in the thermal insulation top. The sleeve prevents the heat exchanger from overheating and also protects the heat exchanger from any direct exposure to the radiation that is emitted by the susceptor crucible. Such an arrangement allows the heat exchanger or the engine head to operate within its design criteria.

In another aspect, an electromagnetic shield is provided where an induction heating method is adopted for heating the susceptor crucible. The electromagnetic shield encapsulates the thermal insulation top and thermal insulation outer.

In accordance with the invention there is also provided a method of converting, storing and retrieving energy, comprising:

powering a heat generator with electrical energy to heat a thermal energy storage material contained in a susceptor crucible thereby converting electrical energy into thermal energy;

storing the thermal energy in the energy storage material contained in the susceptor crucible encased in an insulated thermal housing; and retrieving the stored thermal energy by conducting thermal energy through a side wall of the crucible to transfer to a fluid circulating in a regulated fluid flow circuit.

The method preferably uses renewable energy as its power source. Inductive heating elements receive the energy generated from a renewable or other traditional power generation source and convert the same to electromagnetic flux, which induces the conductor or a susceptor crucible placed within the coil so as to heat the conductor/crucible. Thus electrical energy that is fed to the induction coil is converted to thermal energy in the crucible.

In one embodiment the crucible may include a coating or a layer on the outside of the crucible side wall where the coating or layer responds to inductive heating. The coating or layer can be applied by chemical deposition of a layer that is responsive to inductive heating or by any known coating technique. Materials that can be used include metal powder, such as titanium or tungsten, or materials having a carbon composition, for example graphite and silicon carbide.

The thermal energy is subsequently transferred and stored in the PCM via the susceptor crucible. The PCM on being heated undergoes phase change and in the process stores significant amount of energy in its liquid phase in the form of latent heat. The stored energy is retrieved via the crucible wall and transferred to the energy carrier gas that carries the energy from a position that is near the crucible wall through the fluid circuit and out through the hot fluid outlet and to the head of a heat engine or heat exchanger that is in physical isolation in respect to the position of the crucible. The energy in the carrier gas is further transferred to the working fluid in the heat exchanger that subsequently converts the same to mechanical work resulting in the production of electrical output and heat. The unused energy in the carrier gas is recirculated back to the position where the cycle repeats all over again.

The heated fluid is preferably circulated in the fluid flow circuit by thermal convection through to a circuit outlet. The method preferably provides directly conducting thermal energy from the energy storage material across the side wall of the susceptor crucible and directly into a hot fluid channel of the fluid flow circuit. Such direct drawing of heat by transfer through the crucible wall is yet unknown. Any prior known attempts at retrieving thermal energy from a receptacle containing molten PCM comprise using an intermediate highly conductive layer, or component, placed alongside an exterior wall of the receptacle so to enhance the retrieval rate through the receptacle walls. The rate of heat extraction in such cases is determined by the surface area of the component that is in direct contact with the crucible. Such an arrangement will not allow stacking of the crucibles one over the other. An intermediate piece is not required with the preferred embodiment of the invention.

In another aspect, the method includes retrieving the stored thermal energy to generate power. The energy carrier gas circulates in a closed loop bound by the thermal insulation outer and thermal insulation top. The energy carrier gas flows through the closed channels and is heated in the hot fluid channel as it flows from the base (bottom wall) of the crucible up directly alongside an outside of the crucible wall and to the crucible's upper rim. The design of the crucible enables the crucible walls to efficiently transfer the desired amount of energy (heat) in thermal form in a substantially shorter period of time compared to previous energy retrieval systems.

Resistive heating elements receive the energy generated from a renewable or other traditional power generation source and convert the same to thermal energy to be transferred and stored in the PCM. The transfer of heat from PCM to the carrier gas via the crucible is by way of conduction. The transfer of heat from crucible to the carrier gas is further achieved by way of capturing the radiation emitted by the crucible by the inner walls of the thermal insulation intermediate that are coated with a material that is black in color. Such a coating shall on absorbing the radiation transfer the same to the energy carrier gas due to the black body effect. The energy carrier gas on receiving the energy from the crucible becomes hot and as a result moves under convection from the bottom end of the crucible to the upper rim of the crucible where it enters the thermal chamber.

A gas control valve that is positioned in the thermal insulation inner and the thermal sleeves that are provided in the thermal chamber both assist in controlling the flow of the energy carrier gas into the thermal chamber. The energy carrier gas transfers a desired quantum of energy into the working fluid of the heat exchanger or the head of the heat engine which further results in the production of mechanical or electrical power. On transferring the energy, the energy carrier gas is comparatively cooler to the gas entering the thermal chamber. As a consequence the cooler and heavier gas leaves the thermal chamber governed by laws of physics and thermodynamics and enters the cold gas channel. Essentially, the differential temperatures gives rise to convection that keeps the energy carrier gas moving in the closed loop.

Mechanical devices may be provided in the gas loop to assist the gas movement further. Any unutilized energy remains in the energy carrier gas. Since no energy is lost to the ambience, the electrical power efficiency can be as high as 60% and the combined heat and power efficiency at approximately 95%.

It is envisaged that the fluid circuit could instead be provided as an open loop that can be connected, or 'plugged' into, a compatible energy recovery device that completes the closed loop recirculation of fluid.

In accordance with the present invention there is still further provided an energy storage device, comprising a susceptor crucible having a bottom wall and one or more side walls extending upwardly from the bottom wall therein defining a crucible interior that is closed at an upper end by a top wall, and a thermal energy storage material contained in the crucible interior, wherein the crucible material comprises a polymorphic form of boron nitride in the amount of 50% to 100% by mass. Preferably, the polymorphic form of boron nitride is hexagonal boron nitride.

Hexagonal boron nitride has a layered structure defined by an A-B plane and a C-axis perpendicular to the A-B plane, wherein increased energy conduction occurs in the A-B plane. In an embodiment of the invention, the crucible is constructed so as to orient the A-B plane across the width of the side walls thereby maximizing heat energy conduction through the crucible side walls.

The crucible of the energy storage device is preferably encased in an insulated thermal housing containing a circulating fluid transfer circuit, wherein a portion of the circuit comprises a heating channel in which a heat transfer fluid is heated and circulated toward an outlet and directed towards a heat exchanger, one wall of the heating channel being defined by an outside of the side wall of the crucible such that heat transfers from the energy storage material, through the crucible and to the heat transfer fluid.

BRIEF DESCRIPTION OF THE DRAWINGS

Several features, nature and/or advantages may become apparent from the detailed description set forth below when taken in conjunction with the drawings in which like reference characters identify correspondingly throughout.

DETAILED DESCRIPTION

The detailed description set forth below in connection with the appended drawings is intended as a description of various embodiments of the present invention and is not intended to represent the only embodiments in which the present invention may be practiced. Each embodiment described in this disclosure is provided merely as an example or illustration of the present invention, and should not necessarily be construed as preferred or advantageous over other embodiments. The detailed description includes specific details for the purpose of providing a thorough understanding of the present invention. However, it will be apparent to those skilled in the art that the present invention may be practiced without these specific details.

In the following description, certain terminology is used to describe certain features of the one or more implementations. For instance, the term susceptor crucible refers to a crucible that is heated using electromagnetic energy, converts the same to heat energy and transfers it to a another piece of metal/material that is placed in it to be heated. The term electrical efficiency denotes the useful electrical power output to the total amount of electrical energy consumed in the process.

The present invention relates to the development of a novel energy conversion, storage and retrieval device and method. Such a device could be used, for example, as an outstanding improvement on combined heat and power (CHP) technology that address many of the core issues of the current CHP technologies being employed in the industry.

The invention integrates and develops on various prior arts in the field of furnace technology, metal melting, material science, gas properties, heat engines etc. Essentially, the many aspects of the above mentioned are adopted, modified or integrated in a unique manner that has resulted in a novel energy conversion, storage and retrieval device and method wherein electrical energy from both renewable and traditional energy sources can now be utilized as a reliable source to power up a CHP device. This means that in addition to electricity generated by traditional coal-fired power plants, the device and method can also be powered, and store, electricity generated by solar, wind and other renewable energy sources.

A built-in energy reservoir is provided that is capable of receiving and storing energy. A method of extracting high grade heat from the energy reservoir as desired and with precision temperature control is able to be achieved by the present device and method. Uniform controlled transfer of thermal energy to the heat engine is made possible. The heat exchangers of such engines are protected from thermal fatigue and radiation using adjustable thermal sleeves and flow control valves. Any unutilized energy by the heat engine is returned back to the system thereby increasing the overall thermal to electrical efficiency conversion ratio.

Figure 1:
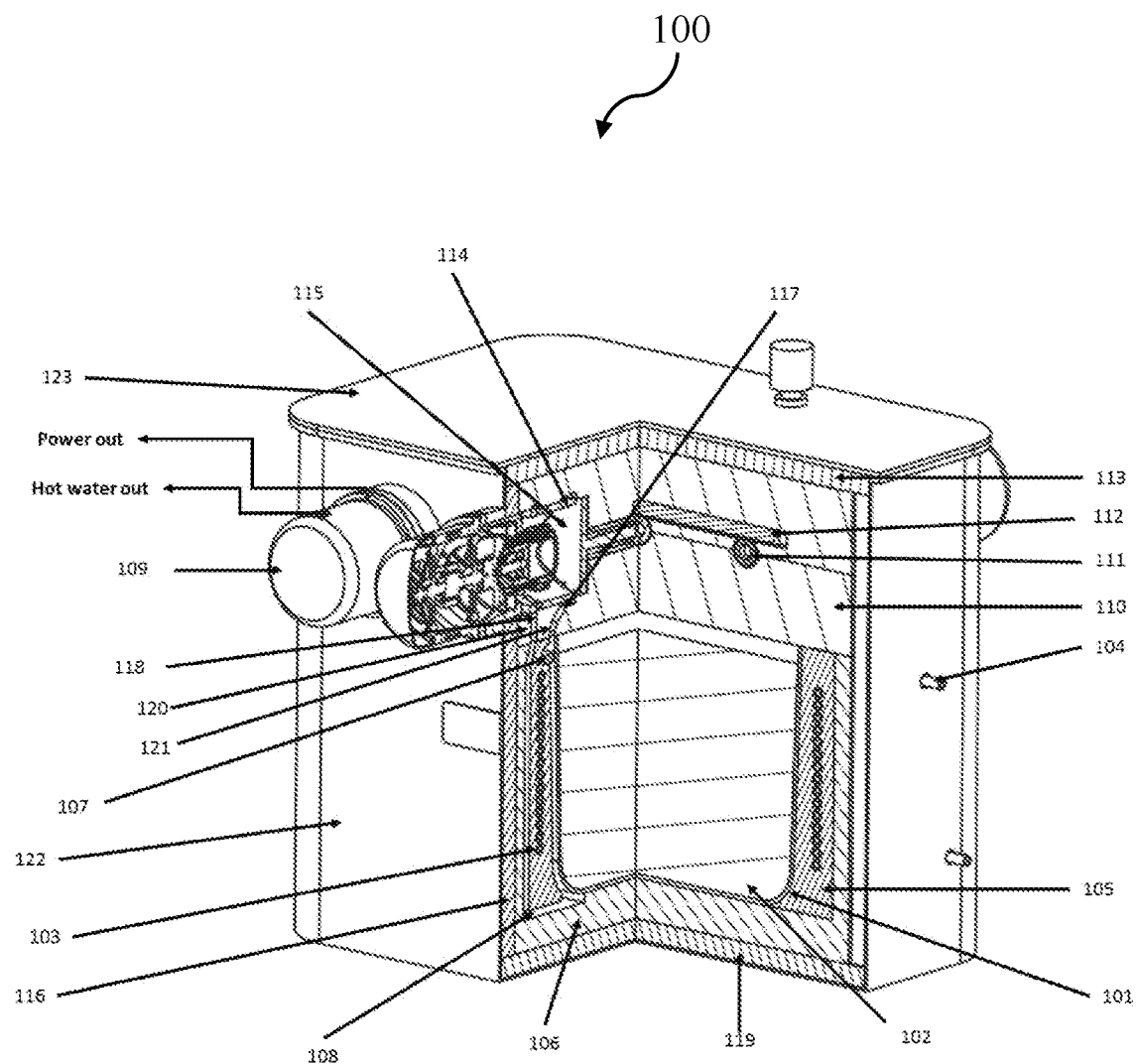
FIG. 1 is an embodiment of an energy conversion, storage and retrieval device in accordance with the present disclosure.

FIG. 1 illustrates an energy conversion, storage and retrieval device and method in the form of an improved combined heat and power device (100), in accordance with an exemplary embodiment of the present disclosure.

The improved combined heat and power device (100) as illustrated in FIG. 1 herein referred to as 'CHP' device stores the energy from the renewable source or from conventional sources in the form of heat and then retrieved and converted into heat and electricity. Thus, the operation of the CHP device can be categorically split into two stages namely: (i) The process of accepting and storing renewable energy and (ii) The process of retrieving the stored energy and generating (clean, sustainable and highly efficient) combined heat and power. Both the above two processes being independent of each other can operate together or in isolation; essentially the energy storage and energy retrieval and production can happen simultaneously.

In its broadest form the embodiments of the energy conversion, storage and energy retrieval device illustrated in the drawings has a susceptor crucible (101) encased in a thermal housing. The thermal housing is comprised of a thermal insulation intermediate (105) that encapsulates the susceptor crucible (101) at its sides and base (underneath its bottom wall), a thermal insulation outer (106) which closely surrounds and contacts the thermal insulation intermediate (105) and a thermal insulation top (110) which sits above the thermal insulation intermediate (105) and the thermal insulation outer (106) and contacts/connects those components to provide an insulated housing around the crucible (101) and to form interior passages or voids that define the fluid circuit flow path.

The susceptor crucible (101) has a bottom wall (601A) and one or more side walls (601) extending upwardly from the bottom wall (601A), therein defining a crucible interior which contains a thermal energy storage material and namely a phase change material (PCM) (102).

A heat generator, which in the embodiments shown are induction coils (103) or resistive elements (1400, 1500, 1600), are powered by renewable or traditional electrical sources to heat the PCM.

A regulated fluid flow circuit (108) in the thermal housing components circulates fluid from a fluid circuit inlet (302), that is heated and circulated to a fluid circuit outlet (301) as heated fluid.

Before discussing the process of accepting and storing renewable energy in the CHP device, it is pertinent to discuss the role of a susceptor crucible (101) illustrated in FIG. 1, the induction heating process and the role of phase change material (102) that stores the energy in the form of latent heat. The term 'susceptor' as used in induction heating denotes an electrically conductive material placed between the induction heating coil and the work piece. In its simplest form, it may be a metal tube interposed between the coil and the material to be heated. Such a susceptor is readily heated by the electromagnetic field established by the induction coil (103), but essentially shields the part within it so that the part is heated primarily by radiation or conduction from the heated susceptor. Use of a susceptor (101) provides an effective means for heating non-conductive materials like ceramics or plastics using an induction heating generator. The susceptor material could also be a ceramic, cermet, composite material or any other known in the art of crucible making.

The use of susceptor crucibles in melting metals using resistive heating method and induction heating method is popular in the metal melting industry. Susceptor allow for heating all metallic and semi conductive materials to be heated and hence play an important role in the electronics, glass, plastics, and rubber industries.

Fundamentally, the susceptor crucible as shown in FIG. 1 is heated using induction heating technique. Firstly, when induction heating via the induction coil power-in (104) is employed, the susceptor crucible (101) is heated electromagnetically, permitting heating through refractories and other non-conducting materials either directly or indirectly. In another embodiment, resistive heating method using resistive heating elements are employed, the thermal energy or heat generated by the heating elements is directly applied to the susceptor crucible (101) by any or all of the conduction, convection or radiation heating methods. The positioning of the heating element inbetween the crucibles maximises the surface area of the heating element that is exposed to either of the crucible, thereby increasing the efficiency of the energy transfer rate to the crucible.

Secondly, a thin susceptor is provided that can be rapidly heated and cooled if desired, creating a heat source that can change temperature very rapidly. The susceptor crucible (101) may be of any size and highly localized in placement for shielding or use as an integral susceptor. In parts with complex geometry, a susceptor improves the uniformity of heating, as compared to direct induction heating. Susceptors allow for very thin materials such as steel strips or wired to be heated to elevated temperatures using nominal frequencies.

In another embodiment there are more than one susceptor crucibles that are placed next to and/or on top of each other, each holding a separate amount of phase change material. See FIG. 14.

Figure 15:
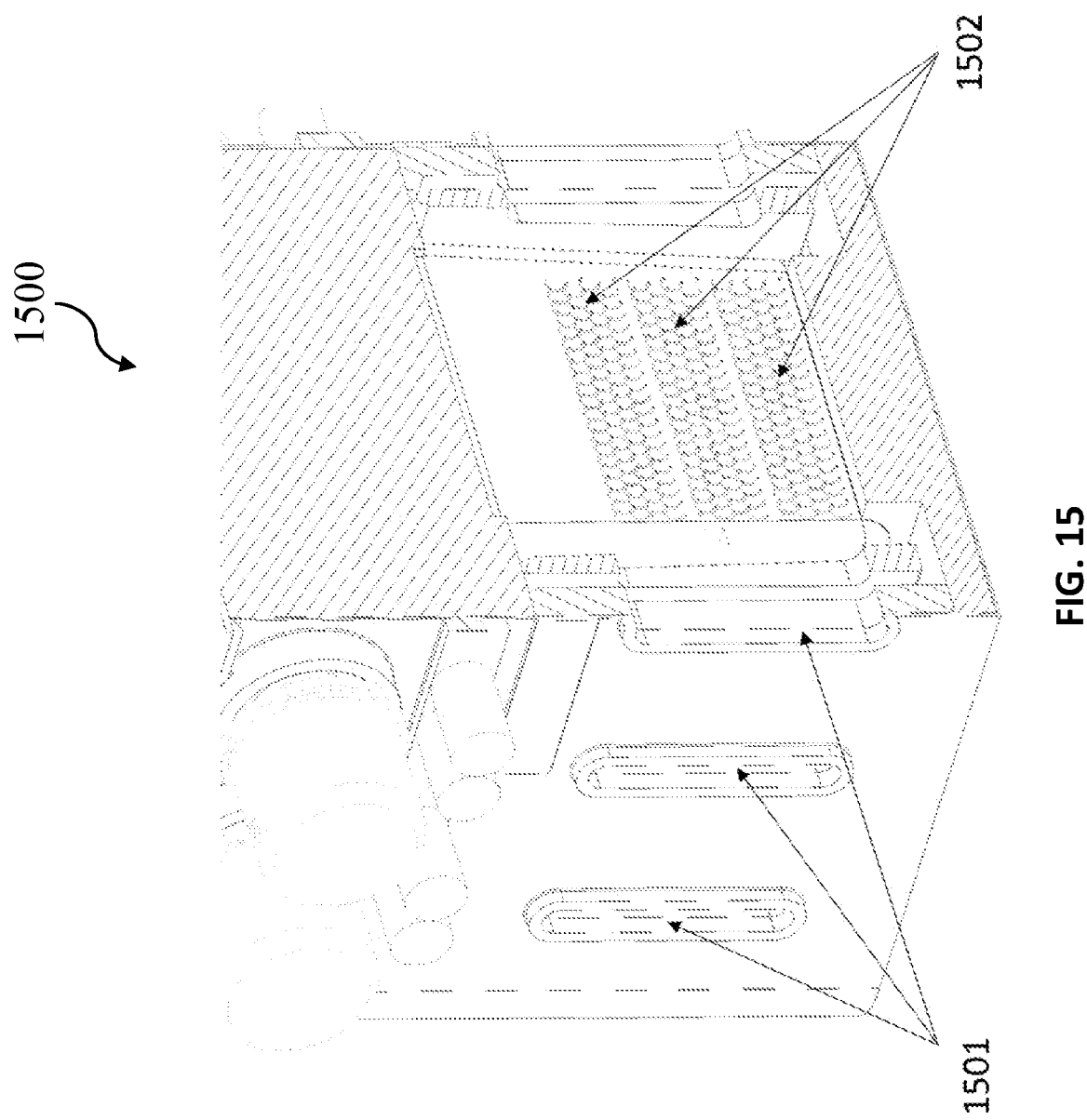
FIG. 15 shows another embodiment of an energy conversion, storage and retrieval device with heating element insert openings for enabling insertion of the resistive heating elements.

FIG. 1 illustrates a phase change material (102) herein referred to as PCM employed in the current invention contained in the crucible (101). The PCM is a poor conductor in a solid state, however it conducts well when in a liquid phase. Therefore in order to facilitate an efficient energy transfer to the PCM (102) a susceptor (101) made of a nitride based ceramic is employed. The susceptor acts as an interface when using induction heating (10) by being induced by the electromagnetic flux and is heated up. Alternatively, when using resistive heating methods as illustrated in FIG. 15 the crucible is heated as a result of the direct exposure of the crucibles (1502) to the heating elements. Subsequently, the heat is transferred to the PCM (102) by conduction and radiation.

The susceptor (101) as illustrated in FIG. 1 essentially has good mechanical strength and has a melting point that is significantly higher than that of the PCM (102). The susceptor is capable of handling thermal cycles well. The susceptor exhibits good thermal conductivity at elevated temperatures and preferably in excess of 100 W/mK. The susceptor crucible (101) has a coefficient of thermal expansion rate that is significantly lower than that of the PCM (102) across the temperature range of 25-1500° C.

Figure 6:
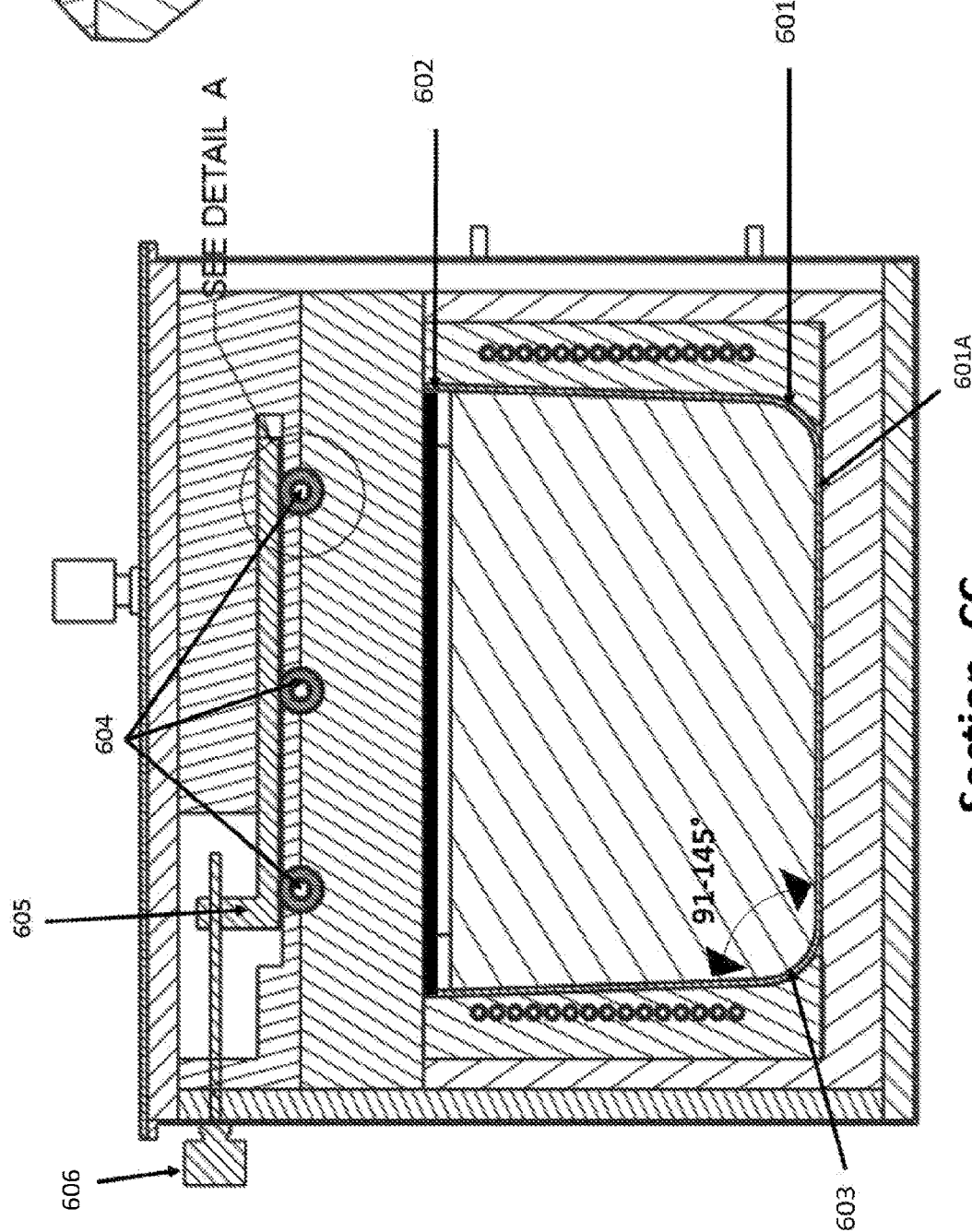
FIG. 6 is the sectional view section CC of FIG. 2A of the susceptor crucible and sleeve control mechanisms in accordance with FIG. 1 the disclosure.

The susceptor crucible (101) is made of preferably nitride based ceramic (herein referred to as Material A), in either pure form or as a composite. A susceptor crucible made (101) of Material A (102) is fabricated, sintered or hot pressed to the required shape before it is further heated if required. The susceptor crucible (101) is non wetting to the PCM at the melting point of the PCM. The susceptor crucible (101) as illustrated in FIG. 1 and FIG. 6 has a flat base with four side walls (601) or tetra side walls that includes inner and outer wall surfaces (603) that are slightly inclined between 91- and 145 degrees to the base, or more than 90°, to form an inverted pyramid. The angles optimise the volume of PCM (102) that can be stored while still being within the acceptable angle that permits the non-wetting behavior of the PCM (102). In addition, sufficient surface area is made available on the outer wall of the crucible to draw the desired amount of energy out during the energy extraction process.

As previously discussed, the crucible (101) described in the illustrated embodiments consists of a nitride based ceramic comprising boron nitride in the major proportion of 50% to 100% by mass. In another version the material of the crucible is a polymorphic form of boron nitride, mixed with a metallic substance rather than a ceramic substance. In any of the embodiments, the polymorphic form of boron nitride is preferably hexagonal boron nitride.

Figure 19:
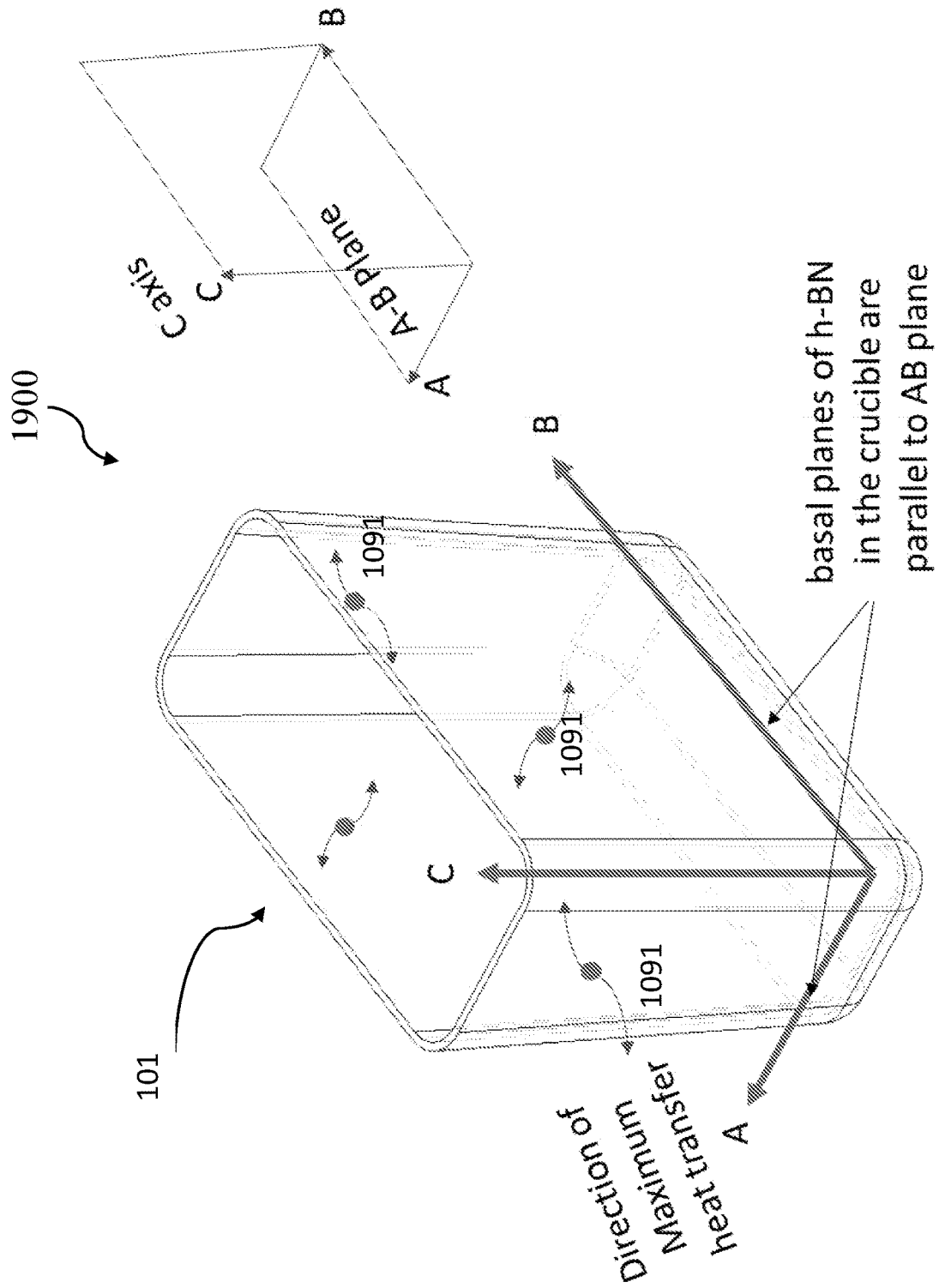
FIG. 19 is a schematic drawing of a crucible showing directional heat transfer through the crucible.

Hexagonal boron nitride (h-BN) has a two-dimensional planar and layered structure that can be defined by an A-B plane and a C-axis perpendicular to the A-B plane. FIGS. 1 and 19 illustrate the direction of A-B-C axis in relation to the sectional cut view of crucible (101). h-BN is anisotropic in terms of its thermal conductivity properties. The thermal conductivity (illustrated by arrows (1901)) in the A-B plane of the material is excellent whereas the conductivity in the perpendicular direction of the C-axis is not. Heat can spread laterally in-plane quite quickly. The crucible is therefore constructed so as to orient the A-B plane across the width of the side walls thereby maximizing heat energy conduction laterally, or horizontally, through the crucible side walls and directly into the hot gas channel, and to minimize heat conduction vertically through the bottom of the crucible.

The susceptor crucible is manufactured by hot pressing the material before furnace sintering. In the described embodiment where the material consists of or mostly comprises h-BN, the elongate and 2-dimensional h-BN structure orients perpendicularly to the hot pressing direction thereby becoming flat and stable thereby preferentially conducting heat in a direction through the crucible's side walls.

Furthermore, h-BN exhibits a very low thermal expansion coefficient (CTE) in the A-B plane ($-0.7$ to $1.1 \times 10^{-6}$ C$^{-1}$) as compared to the C-axis direction ($-2.3 \times 10^{-6}$ C$^-$) at room temperature. h-BN also has a high thermal conductivity, of about 600 W m$^{-1}$ K$^{-1}$ for the in-plane (AB basal plane) direction, yet only 30 W m$^{-1}$ K$^{-1}$ for the out-of-plane C-axis direction. The mechanical properties (modulus of elasticity, etc.) of h-BN also make it a suitable material for use as a susceptor crucible in the present application.

In this application, in one embodiment, an induction coil (103) is placed inside a thermal insulation intermediate (105) that encapsulates the susceptor crucible (101). The manner in which the induction coils are arranged in close proximity to the crucible (101) helps in achieving high energy conversion rates. The overall conversion efficiency of electrical energy to stored energy in the PCM can be in the range of 85%. The 15% or so is further extracted from the system for it to be used as a source of usable heat.

Figure 12:
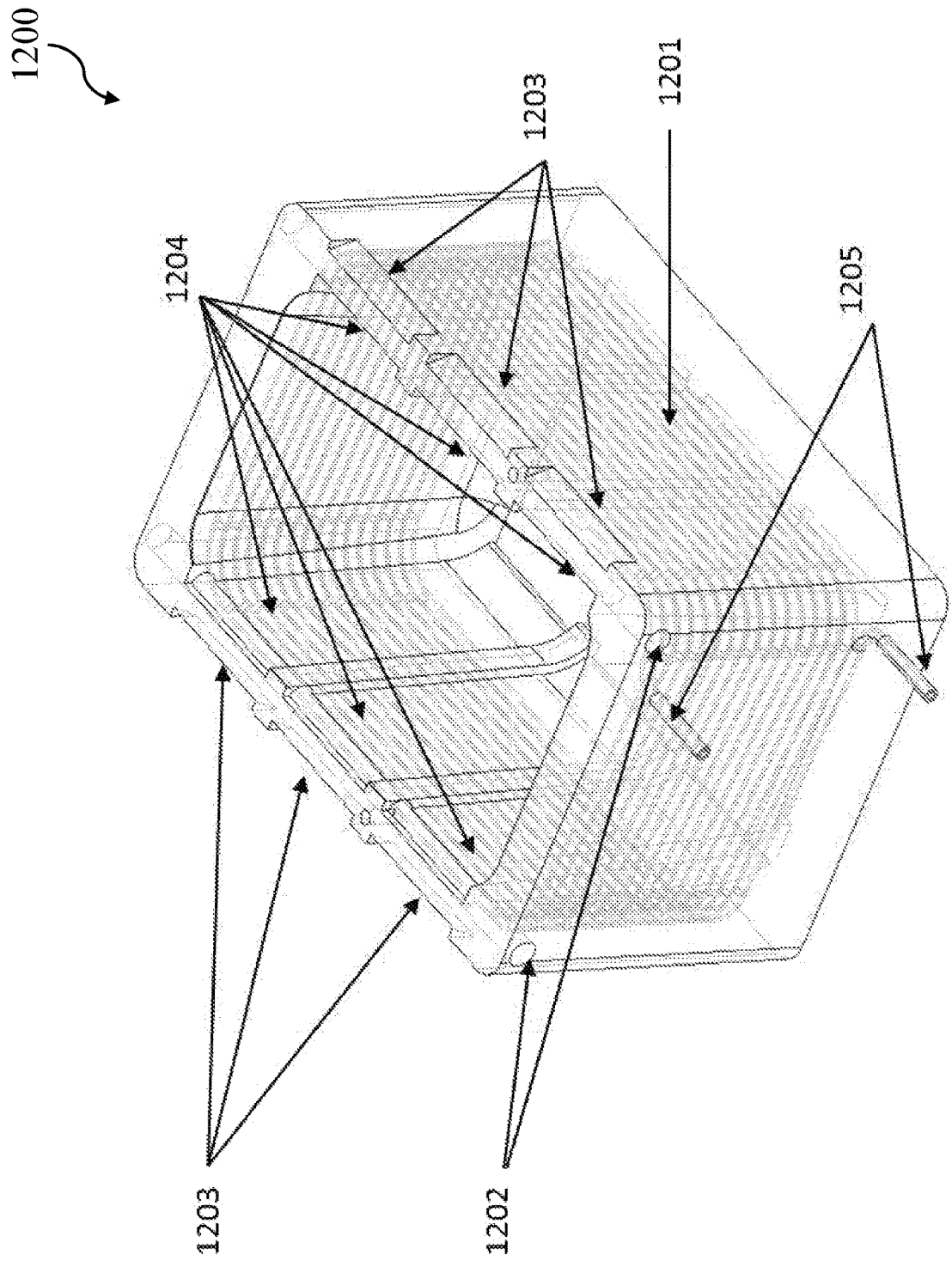
FIG. 12 is an embodiment of the thermal insulation intermediate in accordance with the present disclosure.
Figure 13:
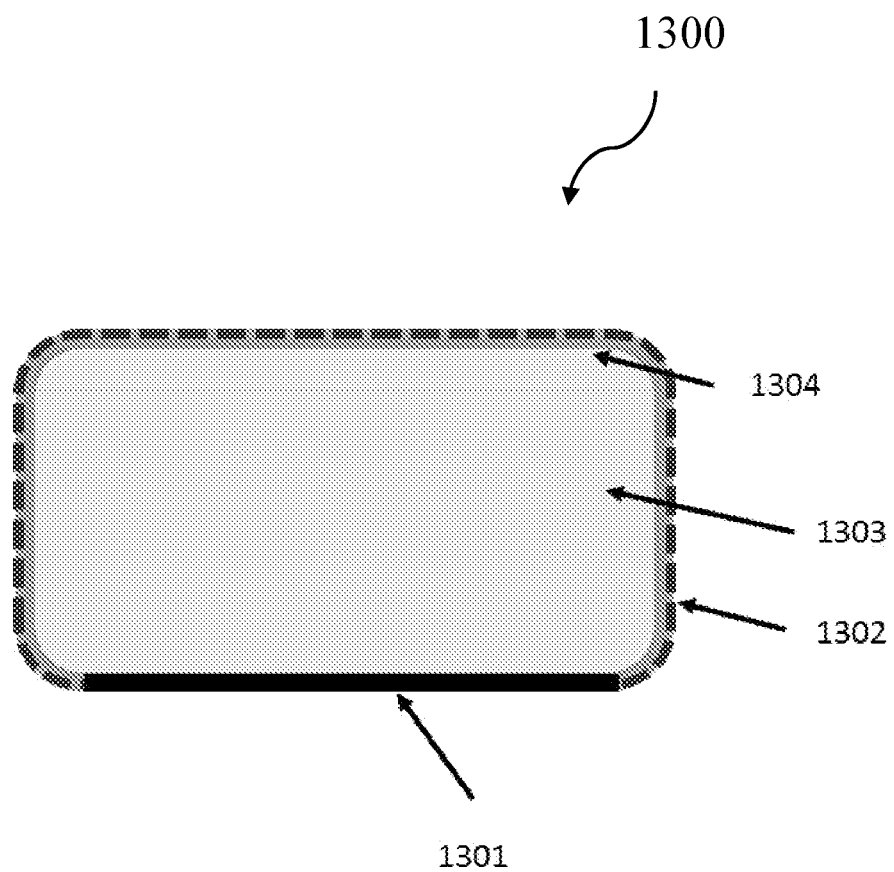
FIG. 13 illustrates the components of the hot gas channel in accordance with the present disclosure.

Thermal insulation intermediate (105) referred in FIG. 1 provides structural stability and holds the susceptor crucible (101) in place. The inner walls (1204, 1304) as illustrated in FIG. 12 and FIG. 13 of the thermal insulation intermediate (105) is coated with a highly conductive material (thermal conductive coating) and is made in one or more pieces from refractory materials, metal mixtures or composites that are not affected by the electromagnetic field. Where induction coils (103) are used for heating, the thermal insulation intermediate (105) holds the induction coil (103) in place, and also holds the coil closest to the crucible and well insulated from the high heat fluxes while still allowing the energy carrier gas (1303) to flow through the hot gas channel without any obstruction.

Figure 3:
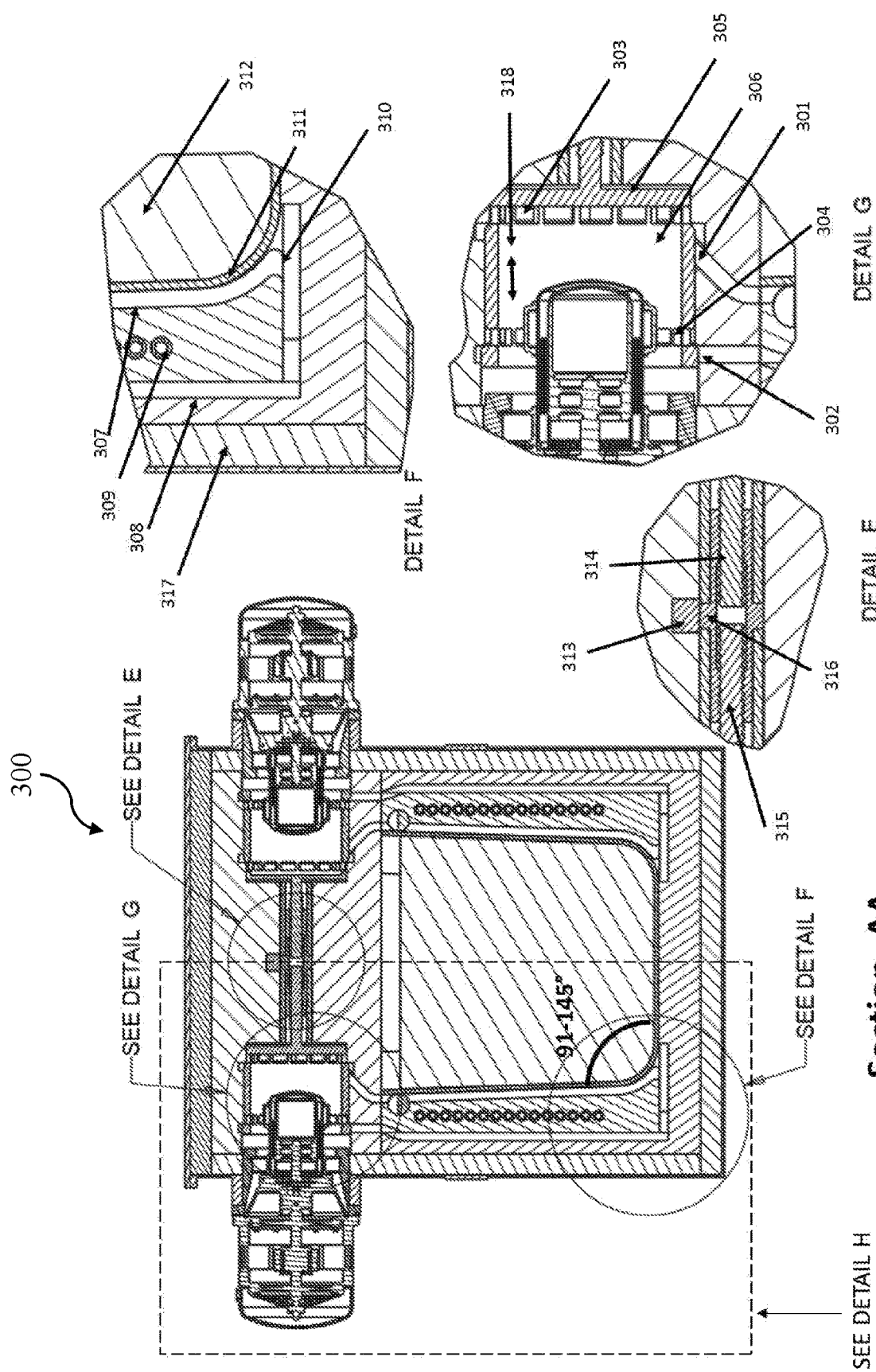
FIG. 3 illustrates the sectional view A-A of FIG. 2A illustrating sleeve control mechanisms, induction coils, electromagnetic shield, susceptor crucible and thermal chamber.
Figure 14:
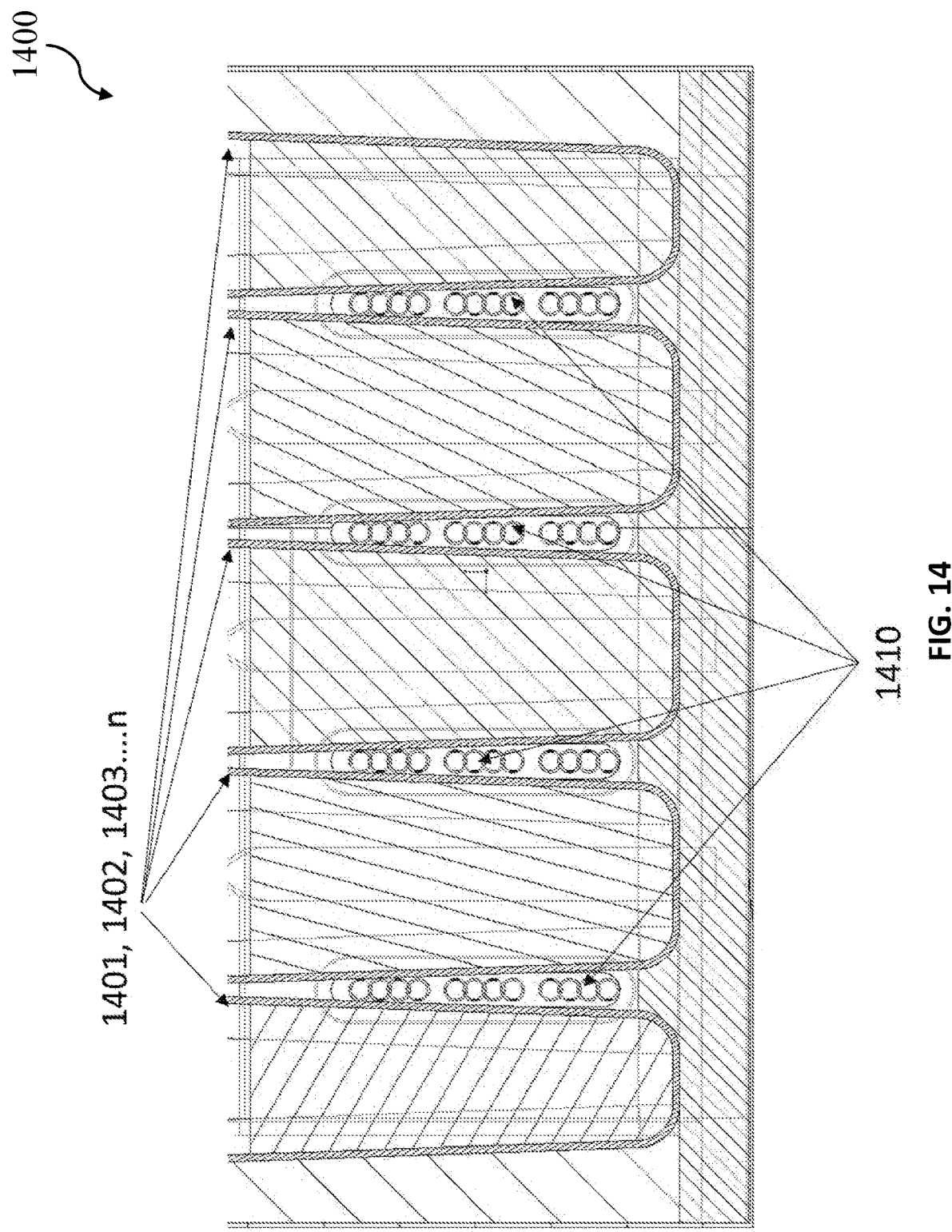
FIG. 14 is another embodiment of an energy conversion, storage and retrieval device that shows a plurality of susceptor crucibles placed next to each other with resistive heating elements placed close to the outer walls of the plurality of crucibles.
Figure 16:
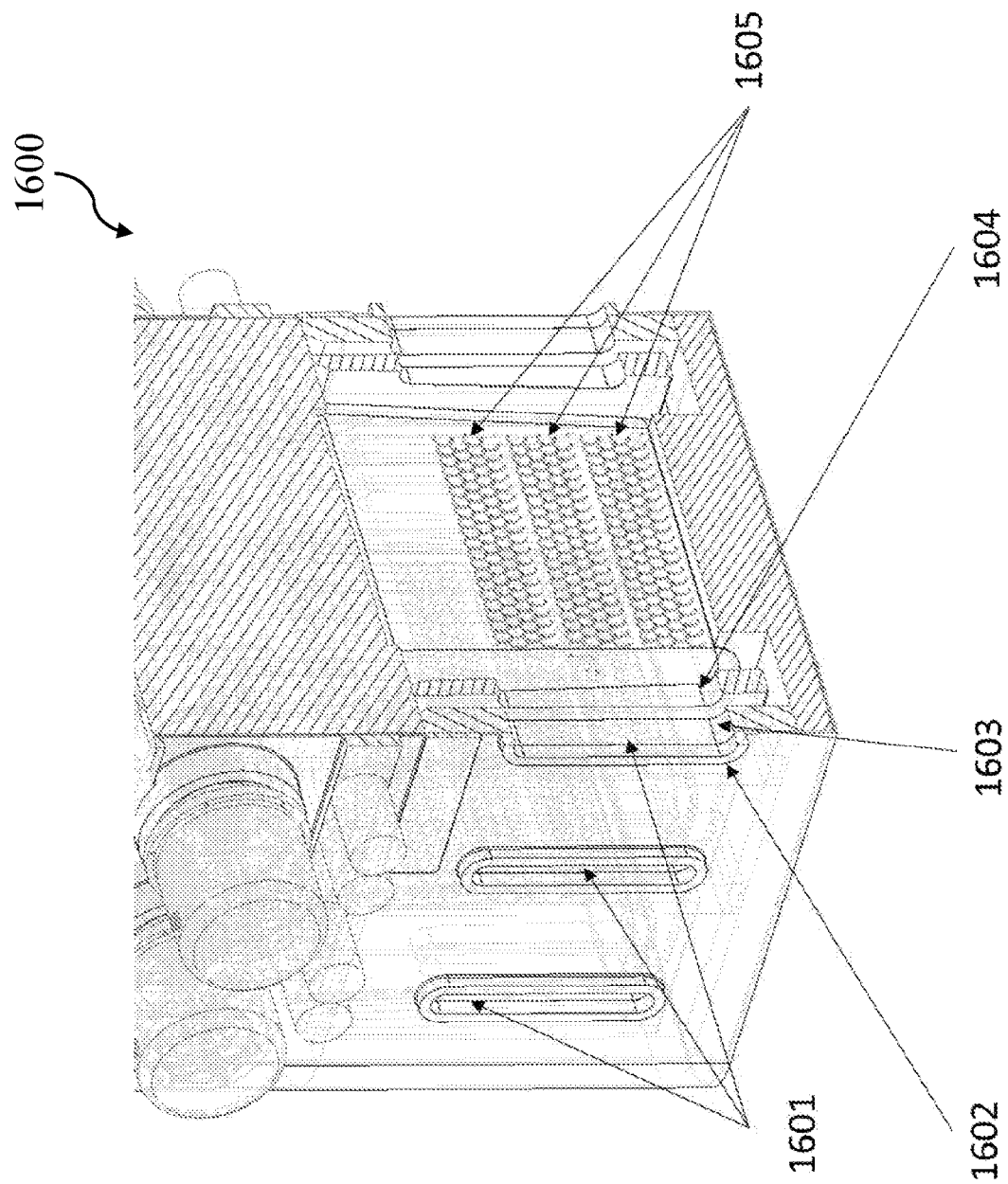
FIGS. 16 and 16A shows an embodiment of the energy conversion, storage and retrieval device with heating element insert openings in the outer shell, thermal insulation outer and thermal insulation intermediate.

In an embodiment where resistive heating elements (1400, 1500, 1600) as illustrated in FIGS. 14 to 16, are used for heating, the thermal insulation intermediate allows for the positioning of the resistive heating elements (1502) in a close proximity to the crucible (101). This design hence allows both heating of the crucible and gas flow in a highly efficient manner. The thermal insulation intermediate (105) forms the remaining three or more sides of the hot gas channel (501C, 1302) that surrounds the crucible, where the crucible forms at least one wall of the hot gas channel. The inner wall (307) of the thermal insulation intermediate (105) as illustrated in FIG. 3 is hotter compared to the outermost wall (308). This differential temperature between the inner wall (307) and the outer wall (308) assists the gas movement due to convection current. The need for conventional mechanical devices to move the carrier gas around the closed loop (108) or circulating gas void is hence avoided, though such devices can be used if desired. The design also allows for the free movement of the energy carrier gas (1303) through the hot gas channel (501C) wherein the carrier gas interacts with the walls of the crucible (601) and the thermal insulation intermediate (105) and collects the desired energy without any obstruction. The thermal insulation intermediate (105) as illustrated in FIG. 1 comprises mechanical flow control valves (107, 801, 901) made of ceramics that assists in regulating the gas flow through the gas loop and thereby controls the amount of energy reaching a thermal chamber (115) that houses a heat engine head. (109).

Thermal insulation outer tub or thermal insulation outer (106) as illustrated in FIG. 1 is in close contact with the said thermal insulation intermediate (105). The thermal insulation outer (106) provides the structural rigidity to the CHP device (100) and enhances the thermal insulation of the device (100). The inner walls (308) of the thermal outer (106) make up at least one or more sides of the cold channel (502C, 121, 403). A thermal insulation top (110) encloses the thermal insulation intermediate (105) and the thermal insulation outer (106). The thermal insulation outer (106) is impermeable to the carrier gas contained within the gas void (108) and hence prevents the carrier gas from leakage. Provision for one or more partial channels that make up the hot and cold gas channels (120, 121) are provided in the thermal insulation top (110).

Figure 2A:
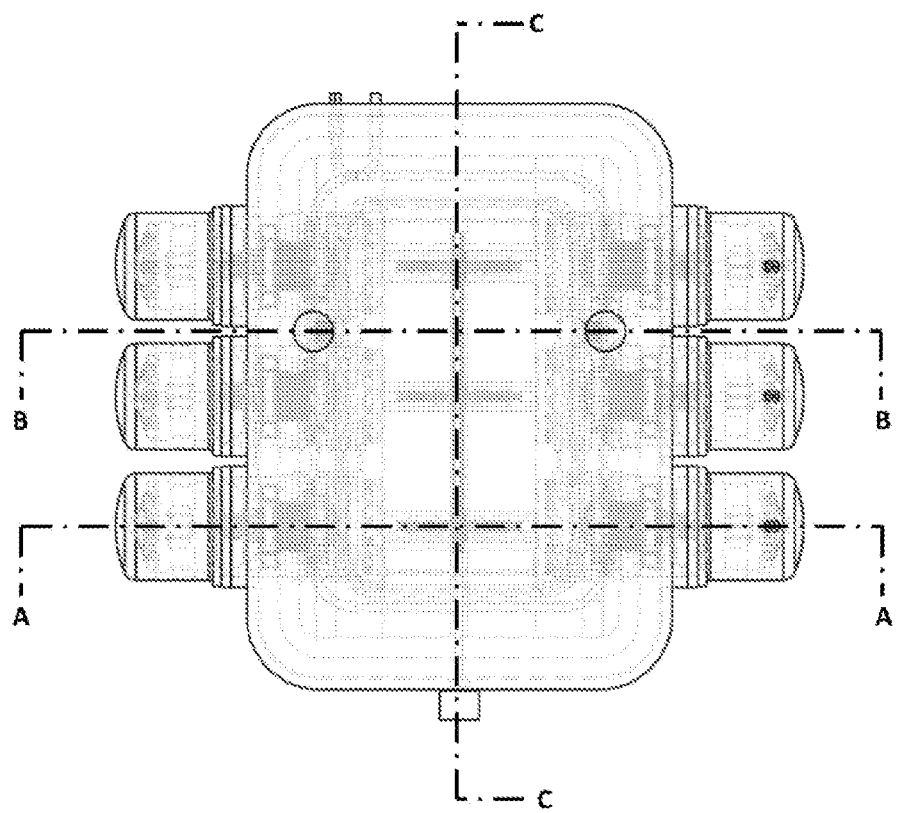
FIGS. 2A-2B is the cross sectional view of the energy conversion, storage and retrieval device in accordance with FIG. 1 of the disclosure.
Figure 2B:
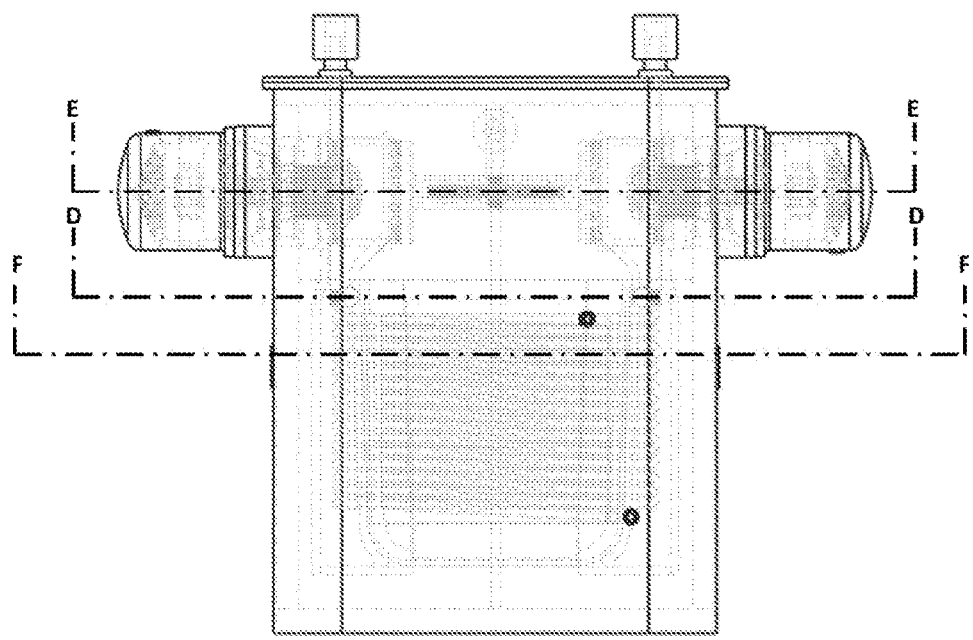

FIGS. 2A and 2B illustrates the cross-sectional views of the device (100). The sectional views AA, BB, CC, DD, EE and FF of the device, components housed thereof and the enhanced views are covered in detail in FIGS. 3 to 12 of this application.

FIG. 3 illustrates the Sectional (Section AA of FIG. 2A) view of a thermal insulation top (110) that houses a thermal chamber (115), thermal sleeves (114) that aids in opening of the gas path and protection of the heat exchanger or heat engine from overheating, a gas inlet port (302), gas outlet port (301), gas inlet (303) and outlet voids (304), thermal sleeve controls, ie., a thermal sleeve control rack (112, 313), thermal sleeve control right (314), thermal sleeve control left (315) and thermal sleeve control pinion (111) for controlling the flow of energy carrier gas (1303) reaching the thermal chamber (115). FIG. 3 also illustrates the sectional view of a thermal insulation intermediate, that houses the PCM (102, 312) for storing the received energy, the induction coils (30) that generate an electromagnetic field to heat the susceptor crucible (101), a closed loop gas void (310) through which the carrier gas circulates from the base of the crucible to the rim and a side electromagnetic shield that prevents the outer shell body from overheating.

Figure 4:
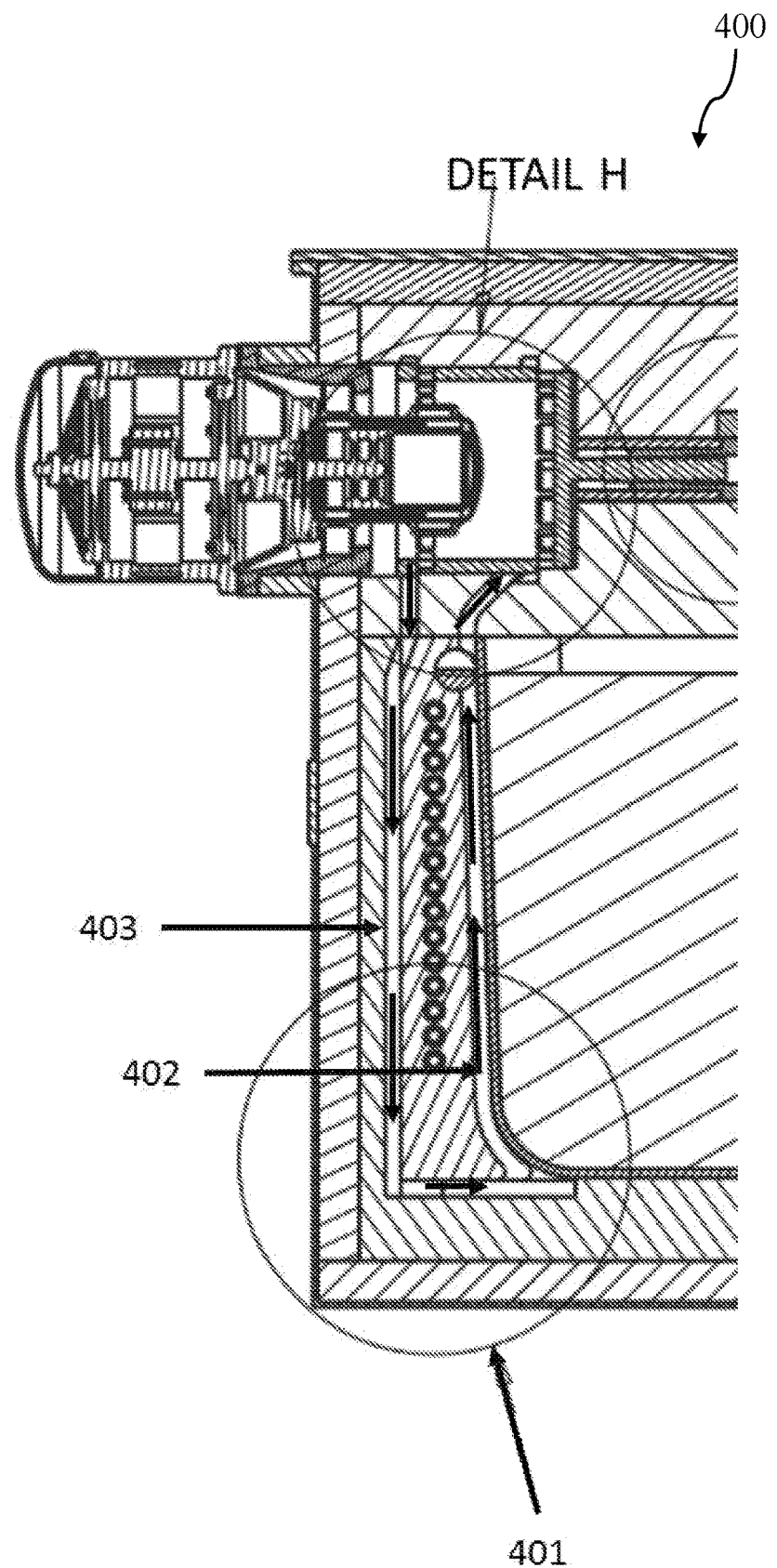
FIG. 4 illustrates a closed loop energy carrier gas path within the gas void.

FIG. 4 illustrates the closed loop energy carrier gas path (400) within a gas void (401) between the inner and outer walls of the thermal insulation intermediate. FIG. 4 further illustrates the flow direction of the carrier gas within a closed loop void (108) indicated by the arrows in the clockwise direction. The energy carrier gas (1303) flows through the closed loop gas void (108) through the closed channels from base of the uniquely designed crucible to the rim. The energy carrier gas (1303) travels in a closed loop fashion within the device and is constrained from leaving the device and is bounded by Thermal Insulation Outer and Thermal insulation top. In an embodiment, FIG. 4 illustrates a hot gas channel (402) that forms the three or more sides of the thermal insulation intermediate (105). The hot gas channel is coated with a thermally conductive material as illustrated further in FIG. 13 to receive the radiated heat from the crucible and to effectively transfer the same to the carrier gas. The energy carrier gas collects (1303) energy from the outer walls of the susceptor crucible (101) and carries it to the thermal chamber (115) as it moves upwards from the bottom end of the crucible to the top end. The carrier gas on transferring the energy to the heat exchanger or the heat engine head carries any un-transferred energy back to the start of the cycle through the cold gas channel (403).

Figure 5:
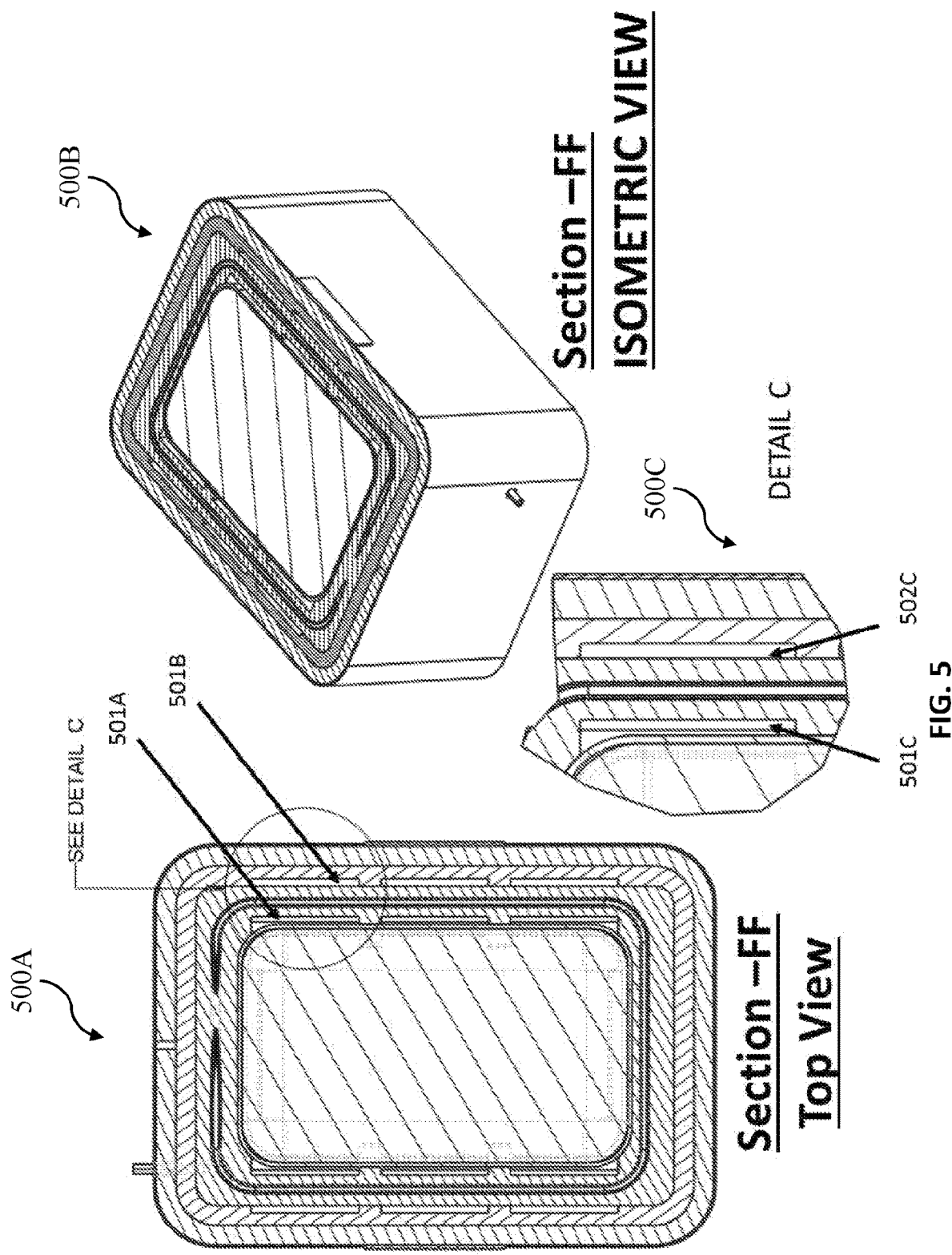
FIG. 5 illustrates the top section view and isometric section FF of FIG. 2B, and enhanced view of the hot and cold gas channel.

FIG. 5 illustrates the top section (Section FF of FIG. 2B) view (500A), enhanced view (500C) and isometric view (500B) of carrier gas that flows the hot gas channel (501C) and the carrier gas out that flows through the cold gas channel (502C). As previously illustrated in FIG. 4, the voids between the inner walls of the thermal insulation outer (106) and the outer walls of the thermal insulation intermediate (105) form the cold gas channel (502C). It is through this cold gas channel that the gas returning back to the hot channel (501C) passes before the gas gets heated up again to commence the next cycle in the closed loop again.

FIG. 6 illustrates the Sectional (Section C-C of FIG. 2A) view that illustrates an embodiment of the device with the side walls of the susceptor crucible (601) inclined at an angle of 91-94 to accommodate maximum phase change material which in turn results in maximum storage of thermal energy. In another embodiment, FIG. 6 shows a lid (602) made of ceramic nitride that covers the susceptor crucible. A thermal sleeve rack (605) and pinion arrangement (604) is provided to enable the movement of the sleeve (114) along the axis. The mechanism consisting of the rack (112, 605), pinion (111, 604 and other gear housing components (802) are housed in the thermal chamber (115) and are made of ceramics or other materials that are suitable for use in high structural strength and high temperature applications. The sleeve mechanism thus allows for the control of the flow of carrier gas both within and out of the thermal chamber (115).

Figure 7:
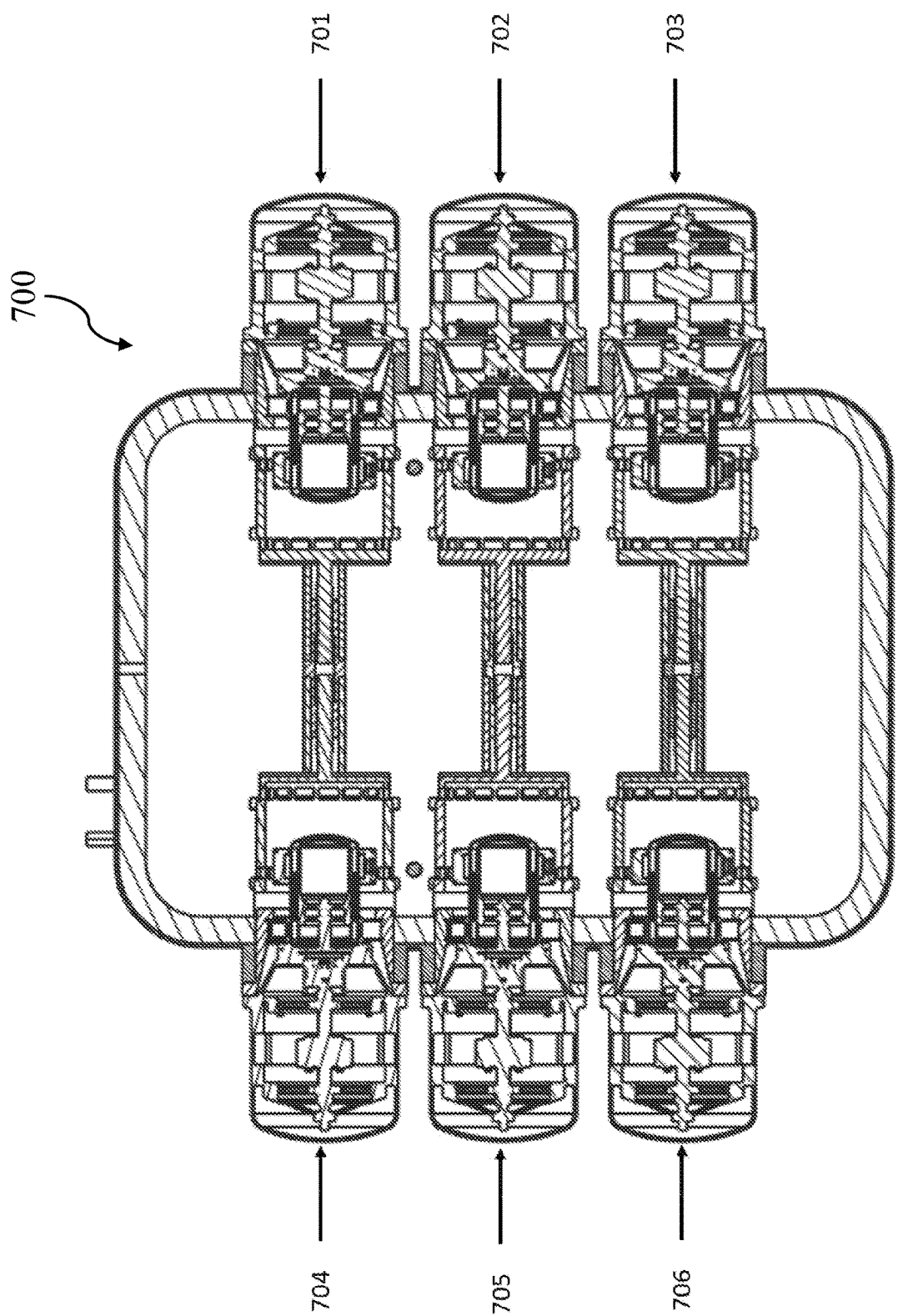
FIG. 7 is the sectional view section EE of FIG. 2B of the mechanism that controls the movement of thermal sleeves.

FIG. 7 illustrates the sectional (Section EE of FIG. 2B) view of the general mechanism that controls the movement of the thermal sleeves (701, 702, 703 . . . ) housed in the thermal chamber (115)

Figure 8:
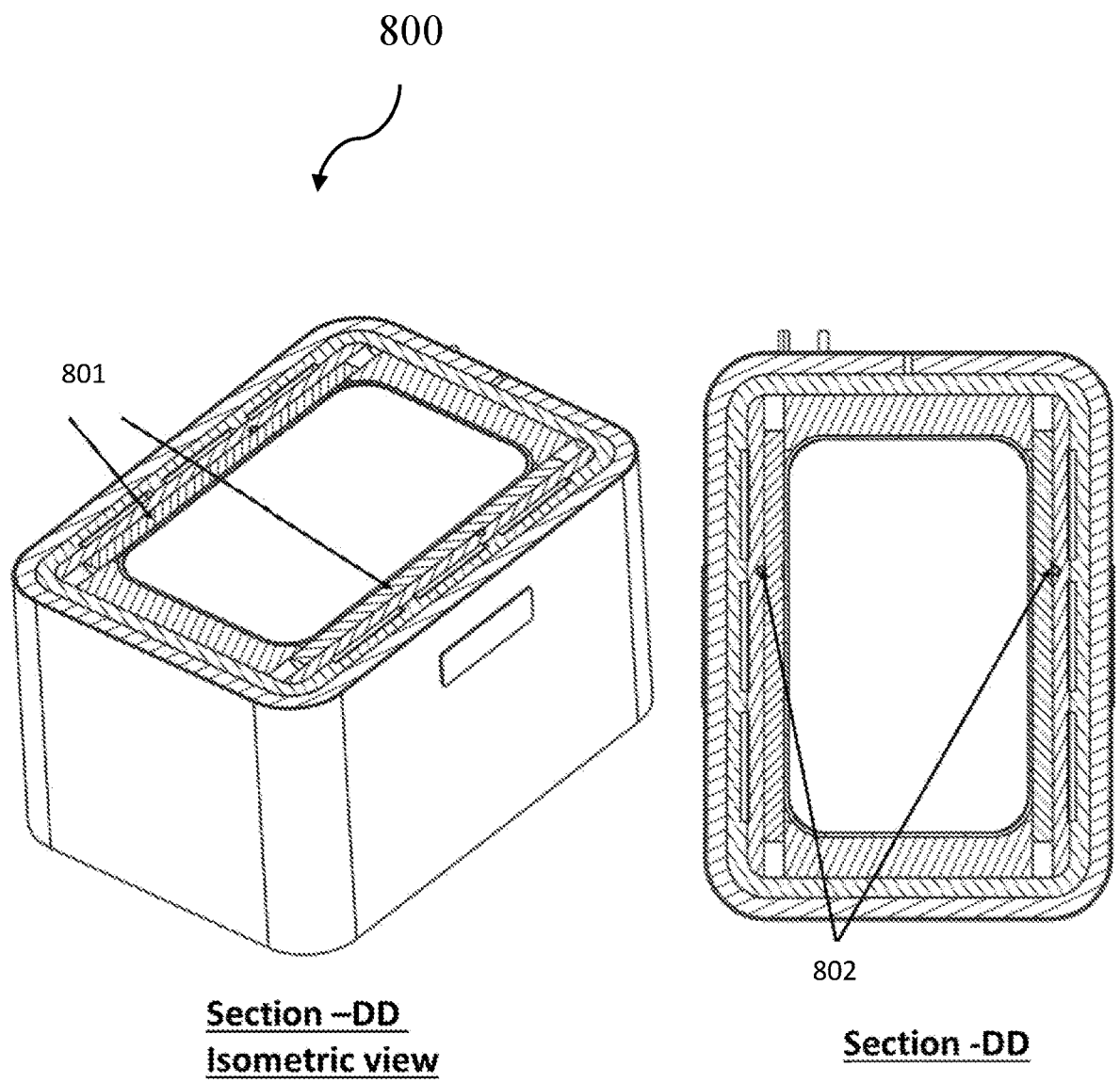
FIGS. 8 and 9 are the sectional views section DD and section BB of FIG. 2B and FIG. 2A of the gas flow control valve and gear pair arrangement operated by servo motors.
Figure 9:
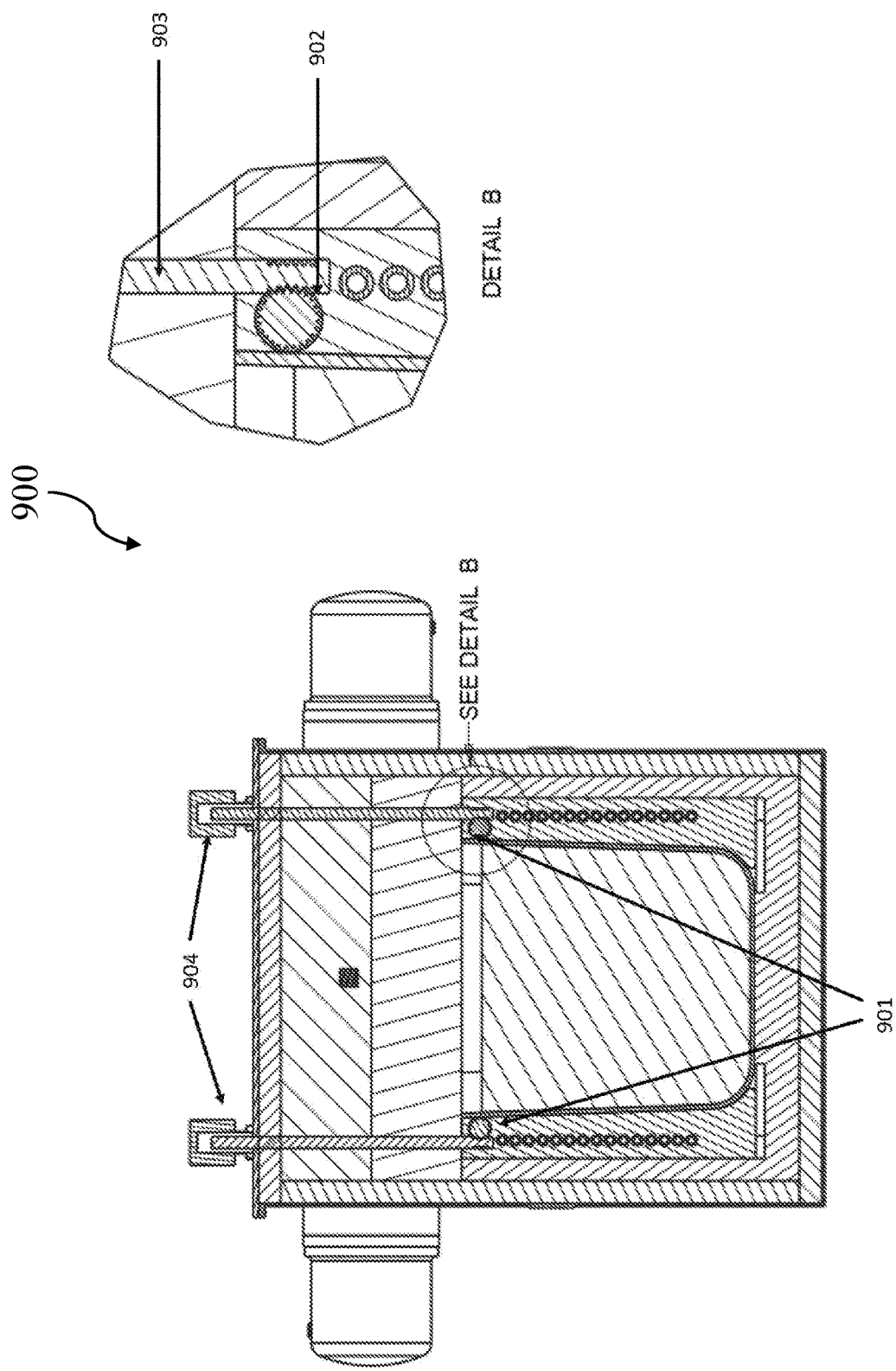

FIGS. 8 and 9 shows the isometric view of a gas flow control valve (801) in the hot gas channel and a gear pair (802) for rotating the gas control valve (801) operated by servo motors (904). FIG. 9 shows the sectional (Section B-B of FIG. 2A) view of the gas control valves (901) placed in the hot gas channel in the thermal insulation intermediate (105) for regulating the gas flow through the channel to control the amount of energy that reaches the thermal chamber (115). A gear pair (902) and a spinning arm (903) that controls the movement of the gas flow control valve is also illustrated in FIG. 9 of this application.

Figure 10:
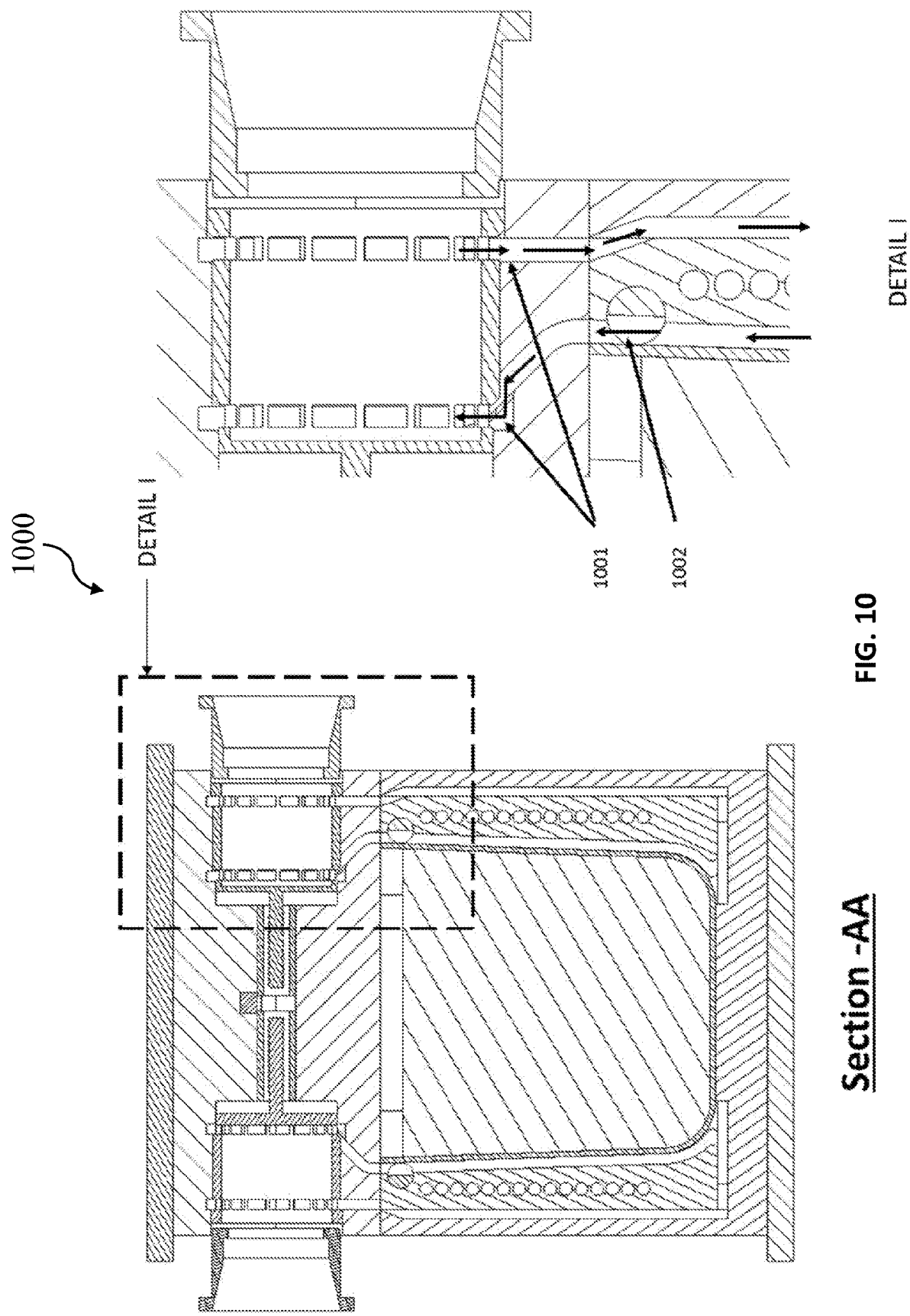
FIG. 10 is the sectional view section EE of FIG. 2B and enhanced view of the gas port in fully open position.

FIG. 10 illustrates the sectional (Section AA of FIG. 2A) view of the gas port (1001) and gas valve (1002) in fully open position. As illustrated in FIG. 10, the amount of energy that reaches the thermal chamber is maximum when the gas port and gas valve is in fully open position (1001, 1002), thereby ensuring that that the flow of carrier gas is at its maximum to the thermal chamber which in turn results in maximum power production by the device (100). A flow of the hot carrier gas through the gas valves and the returning cold carrier gas is illustrated in FIG. 10 with the help of directional arrows.

Figure 11:
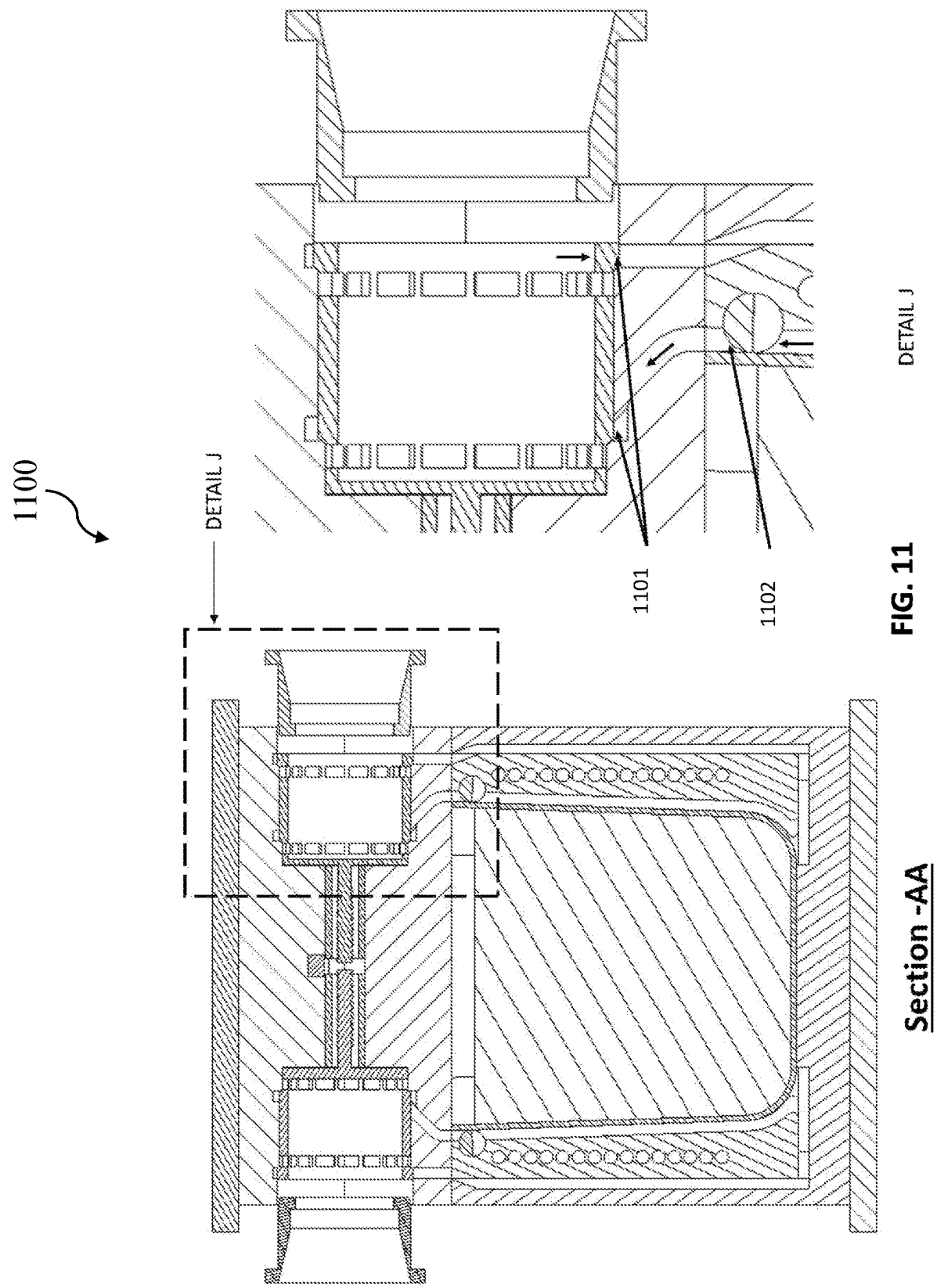
FIG. 11 is the sectional view section EE of FIG. 2B and enhanced view of the gas port in fully closed position when the device is not in use.

FIG. 11 illustrates the sectional (Section AA of FIG. 2A) view of the gas port (1101) and gas valve (1102) in fully closed position. As illustrated in FIG. 11, the energy is contained within the thermal chamber when the gas port and gas valve is in fully closed position, thereby preventing the leakage of energy to the ambient environment.

FIG. 12 illustrates an embodiment of a thermal insulation intermediate (1200) that is in close contact with the thermal insulation outer to provide structural stability to the crucible (101) and holds the susceptor crucible (101) in place. The design of the thermal insulation intermediate (1200) allows to hold the induction coil (103, 1201) in place and protects the same from the direct exposure to high heat fluxes originating from the crucible. The thermal insulation intermediate as illustrated in FIG. 1 and FIG. 12 is designed in such a way that it holds the induction coils closest to the crucible and still allows the energy carrier gas (1303) to flow through the hot gas channel without any obstruction. The thermal insulation intermediate is made in one or more pieces from refractory materials or composites that are not affected by the electromagnetic field. FIG. 12 also illustrates the faces of cold channel (502C) and the hot gas channel (501C), the differential temperature of which facilitates the movement of the carrier gas by natural convection. FIG. 12 also illustrates the gas control valve slots (1202) in hot gas channels (1204) that regulate the flow of carrier gas in the hot gas channel by opening or closing the gas path.

FIG. 13 illustrates the components of the hot gas channel (501C) that carries the energy carrier gas (1303) into the thermal chamber (115). The outermost wall (1301) of the crucible (101) acts as one of the walls of a hot gas channel (501C) along with the three sides of the thermal insulation intermediate (105) that encloses the hot gas channel carrying the energy carrier gas (1303). The outermost wall as illustrated in FIG. 13 is directly exposed to the hot carrier gas and hence acts as one of the walls of the hot gas channel. This interaction of the carrier gas with the outer wall of the susceptor crucible (101) facilitates the energy transfer between the PCM (102) and the energy carrier gas (1303).

FIG. 14 illustrates an another embodiment where a plurality of crucibles (1401, 1402, 1403 . . . 1403n) are placed one next to the other. Each such crucible may have one or more heat sources (1501, 1502, 1503 . . . ) as enunciated in FIG. 15 (resistive heating elements, heating mesh etc) placed very near to one or more outer walls of such a group of crucibles. The heat source generated using resistive heating elements is illustrated as an another embodiment in FIG. 14 The use of such alternative heating techniques in comparison to the induction heating address the energy loss that is otherwise present in cooling the induction coil (103) during the charging process. The resistive heating elements as illustrated in FIG. 15 are placed between the outermost walls of the group of crucibles.

Figure 16A:
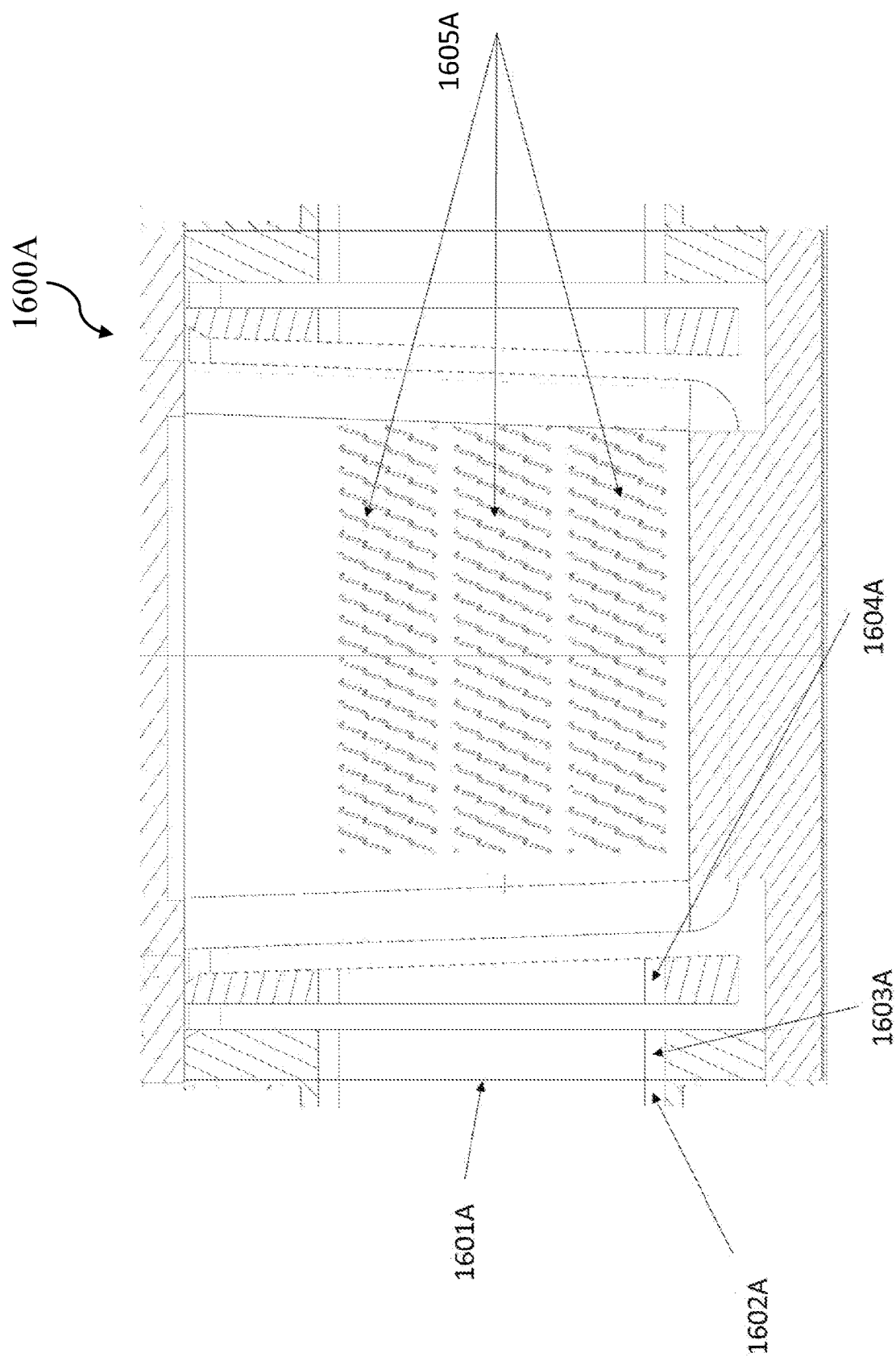

FIGS. 15 and 16 illustrates the embodiment, wherein the induction heating may be replaced by other heating techniques known in the art of heating furnaces such as, resistive elements (1502), mesh heating elements which are placed immediately next to the outer wall of the susceptor crucible (106). The manner in which the resistive heating elements (1502) are arranged in very close proximity to the outer walls (106) of the crucible (101) helps in achieving high energy conversion rates due to the full exposure of the heating element's surface area to the outer walls (106) of the crucible surfaces. By employing the resistive heating elements (1502) it is expected that the overall conversion efficiency of electrical energy to stored energy in PCM A can be close to 100%, since any energy conversion loss in the heating elements also result in the form of heat and remain within the device (1500). FIG. 16 illustrates the heating element insert openings that may be provided in the outer shell (1601, 1602), thermal insulation outer (1603) and thermal insulation intermediate (1604). FIG. 16A also illustrates one another view of heating element insert openings in the said outer shell (1602A), thermal insulation outer (1603A) and thermal insulation intermediate (1604A). Where an alternative heating method is employed such as the resistive elements, heating mesh etc. as a replacement to induction heating, the EMF shield is removed and the space thus available is used to increase the overall dimensions of the various components to allow for increased volume of PCM (102) storage.

In both of the above mentioned methods of heating PCM (102), majority of the first melt happens via the heat conduction that happens through the susceptor to PCM (102) and by radiation. However there is also a minimal heat transfer that happens as a result of direct heating of the PCM too.

The electrical energy is hence forth stored as thermal energy or otherwise defined as latent heat in the PCM (102). Hence, the process of accepting and storing renewable energy is established.

The above said process of accepting renewable energy and converting the same to thermal energy so as to facilitate its storage is adapted from prior art from the field of well-established metal melting technologies and methods including where induction heating techniques using induction coils (103) and resistive heating techniques using resistive heating elements (1410) are employed.

Once the energy is stored in the PCM (102) in the form of latent heat, the stored energy needs to be retrieved for further conversion to electric power and hot water. In the current device, a closed cycle gas loop (401) is employed to achieve the above mentioned outcome as previously illustrated in FIG. 4. The susceptor crucible (101) as illustrated in FIG. 1 has a good thermal conductivity property. This technical capability of the material is exploited to draw the stored energy out of the susceptor crucible (101). An inert gas G, that has good thermal properties is employed for this purpose. Suitable gases include argon and nitrogen (noninert nitrogen). The crucible (100, 1400, 1500) is suitable designed to allow required quantity of the gas to flow from its base to the rim in one or more channels. The channels are designed to maximize the heat transfer to the gas in the shortest possible time. While the crucible walls (601) transfer the heat to the carrier gas (1303) through conduction, the heat that is radiated out by the crucible lands on the walls of the thermal insulation intermediate (105). Such walls are coated with a material having high thermal conductivity as illustrated in FIG. 13 to facilitate the transfer of the radiated heat into the energy carrier gas (1303) due to the black body effect.

Mechanical methods are employed as previously illustrated in FIG. 3 and FIG. 5-11 to regulate the gas flowing upwards to the energy transfer chamber. The regulation allows the control of the volume of gas reaching the thermal chamber (115) and as a consequence the energy reaching the chamber. In this invention, flow control valves (801) and thermal sleeves (114) regulate the gas flow. While the flow control valves (801) are housed in the thermal insulation intermediate (105) as illustrated in FIG. 1 and FIG. 8 and are controlled independently to thermal sleeves (114), the thermal sleeves are housed in the thermal chamber (115). The thermal sleeves (114) allows for controlling the flow of the carrier gas within and out of the thermal chamber (115) and provides a means to regulate the power produced by the device (100). The thermal chamber (115) encapsulates the energy carrier gas as the gas passes through the chamber and transfers the energy to the head of the heat engine (109). The thermal chamber (115) also houses the mechanisms that controls the movement of the thermal sleeve (114) as previously described. The thermal chamber (115) is impermeable to the carrier gas. In another embodiment, special coatings may be applied to the inner walls of the thermal chamber (115) that is exposed to the carrier gas to prevent the carrier gas leakage. The materials employed for the both the above-mentioned mechanical methods of control gas flow are of refractory in nature with good mechanical properties. Where extra effort is required to facilitate the gas movement a mechanical device made of ceramics may be provided in the gas loop (401).

The sleeve (114, 305) as illustrated in FIGS. 1 and 3, is mechanical driven (604, 605) and serves two purposes. (i) The two rows of slots 117 provided (one row at each end) allows for the control of the opening size of the gas path. As illustrated in FIG. 11, the sleeve can be used to full open (1002) or close the gas path (1102) or anything in between. When the system is not in use, the sleeve can be shut completely (1102) so as to completely restrict the gas movement and (ii) the sleeve also functions as a safety mechanism that acts as a radiation barrier against the radiation emitted by thermal reservoir from reaching the heat engine head or the heat exchanger.

Other than the two control mechanisms, there are no moving parts in the system (both for charging and retrieval of energy) and as such the system functions as a solid state energy storage and retrieval device.

The thermal energy in the gas that is received in the thermal chamber (115) as illustrated in FIG. 1 and FIG. 3 needs to be transferred to a heat exchanger or the head of the heat engine (109) before the thermal energy can be converted to work. The gas that is received in the thermal chamber (115) as discussed above holds high quality heat and is almost uniformly applied over the entire surface area of the heat exchangers or the hot head of the heat engine.

In the case of the heat engine, the energy is transferred in to the working gas of the engine (109) via a hot head (also a type of heat exchanger). The gas expands and does work on the pistons thereby producing mechanical/electrical power. The by-product of such an engine is hot water, which could be treated as useable heat. Example of such an engine is a Sterling engine.

In an another embodiment, the thermal chamber (115) may house an heat exchanger as an alternative to the said heat engine head. In the case where a heat exchanger is provided, the fluid in the heat exchanger is heated as a result of the energy transfer that happens between the comparatively cold fluid in the heat exchanger and the hot energy carrier gas. The fluid in the heat exchanger carries the energy to a desired location where it is further transferred to a suitable thermal cycle for production of power or heat or both.

It must be noted that there are no emissions that result as part of the process that involves storing, retrieval, conversion and production of electricity. Any heat that is rejected as by-product is further used for other applications as special heating; hot water etc. Therefore a novel technology is presented in this application that allows for clean, sustainable, green, highly efficient, combined heat and power generation technology with built-in energy storage.

It must be also be noted that in both the above mentioned cases, any unused energy in the energy carrier gas remains in the gas and is recycled. The carrier gas on transferring the energy to the heat exchanger or the heat engine head (109) carries any un-utilised energy back to the start of the cycle. This efficient process requires energy in the gas to be topped up in the hot channel (501C) to a value that is equivalent to the amount of energy that is transferred to the heat exchanger or the heat engine (109) within the thermal chamber (115).

The transfer of energy into the heat exchangers or the hot head of the heat engine (109) via the energy carrier gas results in hot spot free energy transfer. Such a method of transfer is considered to be highly efficient owing to the application of energy to the entire surface area of the heat exchanger as against the partial exposed surfaces that are otherwise involved when heat exchangers are subjected to direct exposed to the hot surface. The direct exposure to the heat source results in localized thermal stress due to uneven distribution of energy and the effect of un-controlled thermal radiation. Such localized heating may result in temperatures that are in excess of the operating parameters of the materials or fabrication techniques employed and often result in failures such as punctures in heat exchanger tubes, weld joints giving way to name a few. The closed cycle gas loop (401) presented in this invention comprehensively address the above mentioned issues by separating the energy source and the energy application regions. Also the effect of radiation is greatly mitigated.

The susceptor crucible (101), thermal insulation intermediate (105), thermal insulation outer (106) and thermal insulation top (110) are all enclosed in an electromagnetic field (EMF) shield (113, 116, 119) comprising a top electromagnetic shield (113), base electromagnetic shield (119) and side electromagnetic shields (116) where an induction heating method is used for heating the crucible. The electromagnetic shield (113, 116, 119) made in one or many parts is attached to the inner side of the outer shell body (122) that encloses the device (100). The shield is made up of multiple thin sheets of metal as know in the art of induction heating and is arranged vertically and along the inner wall of the outer shell body covering much of the surface area of the wall. The shield prevents the outer metal shell (122) from heating during the charging cycles. The Base electromagnetic shield (119) is provided at the base of the device which provides electromagnetic shielding to the base of the Outer shell body (122). In another embodiment, where an alternative heating method (1500) is employed such as the resistive elements, heating mesh etc. as a replacement to induction heating, the EMF shield is removed and the space thus available is used to increase the overall dimensions of the various components to allow for increased volume of PCM storage.

In another embodiment, where resistive heating method as illustrated in FIG. 15 is employed as heat source the top, outer shell and the outer shell body enclose the susceptor crucible, thermal insulation intermediate, thermal insulation outer and thermal insulation top.

Figure 17:
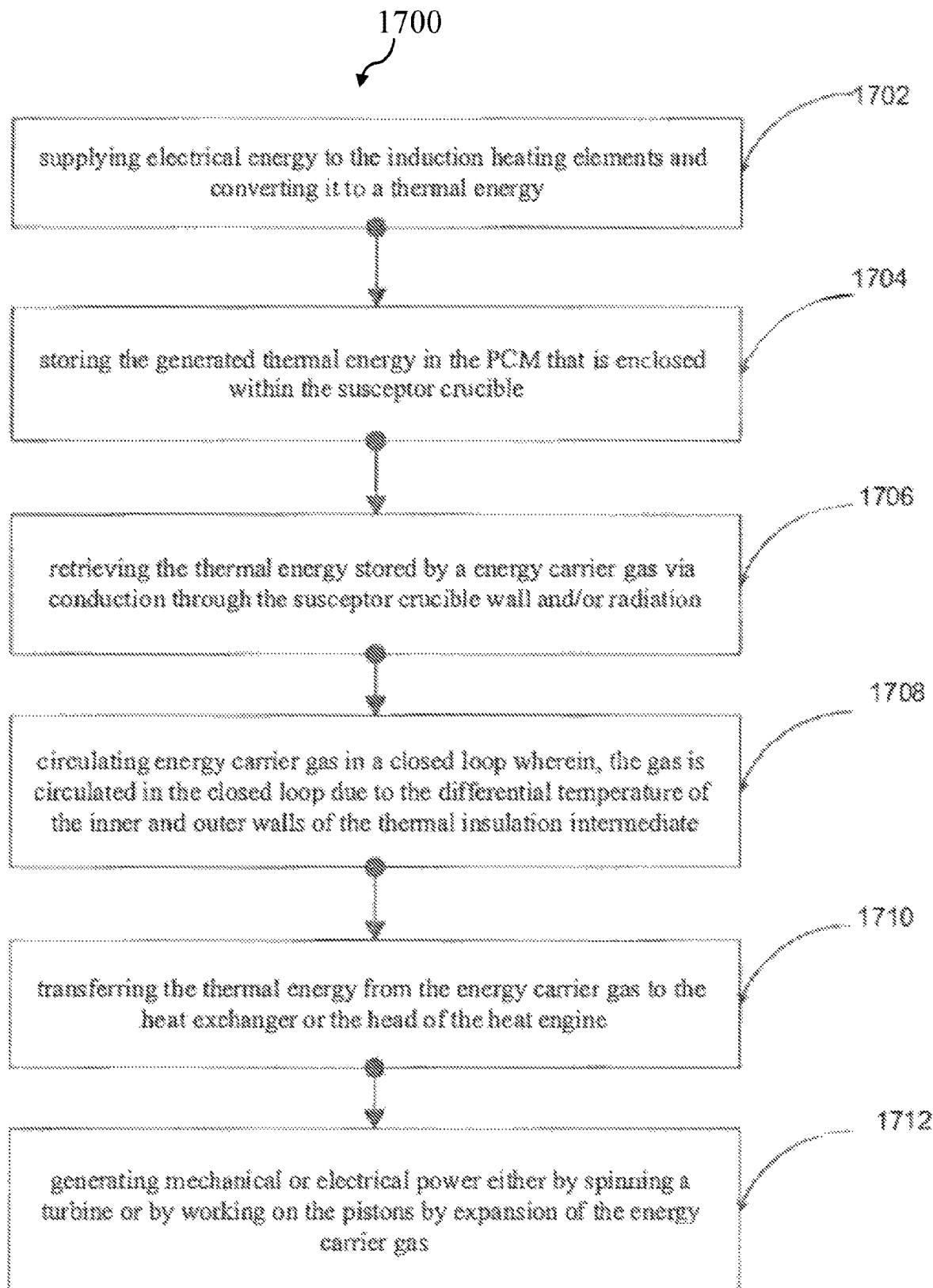
FIG. 17 illustrates an embodiment of a method of combined heat and power for storing, retrieving, and generating power in accordance with FIG. 1 of the disclosure.

In an embodiment, FIG. 17 illustrates a method (1700) of combined heat and power for storing, retrieving, and generating power in accordance with FIG. 1 of the disclosure, comprising the steps of supplying (1702) electrical energy to the induction coil and converting it to a thermal energy, storing (1704) the generated thermal energy in the PCM that is enclosed within the susceptor crucible, retrieving (1706) the thermal energy stored by a energy carrier gas via conduction through the susceptor crucible wall and/or radiation, circulating (1708) energy carrier gas in a closed loop wherein, the gas is circulated in the closed loop due to the differential temperature of the inner and outer walls of the thermal insulation intermediate, transferring (1710) the thermal energy from the energy carrier gas to the heat exchanger or the head of the heat engine and generating (1712)

mechanical or electrical power either by spinning a turbine or by working on the pistons by expansion of the energy carrier gas.

Figure 18:
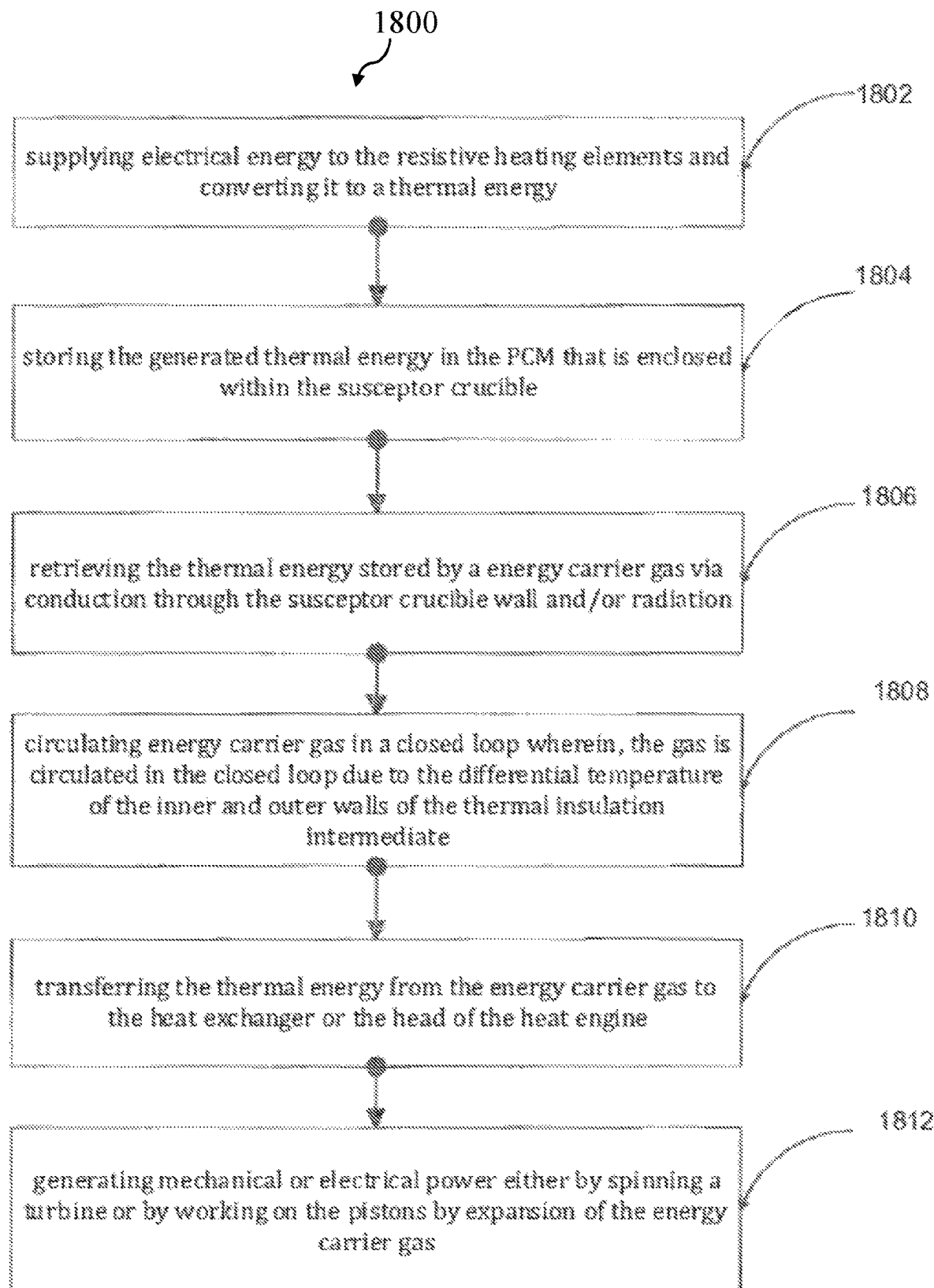
FIG. 18 illustrates an embodiment of a method of combined heat and power for storing, retrieving, and generating power in accordance with FIGS. 14-16 of the disclosure.

In an embodiment, FIG. 18 illustrates a flowchart outlining a method (1800) of combined heat and power for storing, retrieving, and generating power in accordance with FIGS. 14 to 16 of the disclosure, comprising the steps of supplying (1802) electrical energy to the resistive heating elements and converting to thermal output, storing (1804) the generated thermal energy in the PCM that is enclosed within the susceptor crucible, retrieving (1806) the thermal energy stored by a energy carrier gas via conduction through the susceptor crucible wall and/or radiation, circulating (1808) energy carrier gas in a closed loop wherein, the gas is circulated in the closed loop due to the differential temperature of the inner and outer walls of the thermal insulation intermediate, transferring (1810) the thermal energy from the energy carrier gas to the heat exchanger or the head of the heat engine; and generating (1812) mechanical or electrical power either by spinning a turbine or by working on the pistons by expansion of the energy carrier gas.

The present invention provides the advantage of an energy storage device that is able to capture electrical energy from renewable energy sources. The stored thermal energy, converted from electrical, can then be retrieved on demand for use and further conversion back to electrical energy, or other forms including heat and mechanical energy. The device and method embodying the present system of energy conversion, storage and retrieval is efficient, effective and can be repeatedly used with a long life. One reason is that the system provides for a high energy conversion efficiency in its stored form but also provides for a very effective retrieval and transfer of energy from the PCM to the system output at the hot fluid outlet. Accordingly, the system will find use in any domestic or commercial environment where the storage of energy may be required. Furthermore, the system may be easily scaled up or down to suit large commercial or small domestic applications.

The power output and efficiencies achievable by the current system are attractive across a wide range of industries. In one example an energy conversion, storage and retrieval device using resistor elements to convert electrical energy into thermal energy is capable of holding 230 kg of thermal energy storage material (in the form of a silicon mixture) in each susceptor crucible. Each kilogram of silicon is capable of storing approximately 0.5 KW of energy. Using a Stirling engine as the heat recovery system attached to the present device, about 50-60% of the device's output will be electrical with the balance being hot water. This calculates to a device output of 57.5 to 69.0 KW/hr of electrical output and 46.0 to 57.5. KW/hr equivalent of thermal output.

Persons skilled in the art would appreciate that the various features of the invention described herein can be implemented in different systems/devices without departing from the invention. It should also be noted that the foregoing embodiments are merely examples and are not to be construed as limiting the invention. The description of the embodiments is intended to be illustrative, and is not limit the scope of the invention. Thus the present teachings described herein may be readily applied to other types of apparatuses or device and other alternatives, modifications and variations will be apparent to those skilled in the art.

I claim:

1. An energy conversion, storage and retrieval device, comprising:
   a susceptor crucible encased in a thermal housing having a thermal insulation intermediate, the susceptor crucible having a bottom wall and one or more side walls extending upwardly from the bottom wall at an angle of between 90° to 145° to the bottom wall, therein defining a crucible interior which contains a thermal energy storage material to which the susceptor crucible is non wetting, wherein the energy storage material consists of 95 to 100% by mass silicon, and 0 to 5% by mass silicon carbide and/or boron;
   a heat generator powered by an electrical energy source and configured to heat the energy storage material, the heat generator including an induction coil embedded in the thermal insulation intermediate and vertically surrounding at least part of the susceptor crucible; and
   a regulated fluid flow circuit in the housing that circulates fluid from a fluid circuit inlet, that is heated and circulated to a fluid circuit outlet as heated fluid;
   such that when heated, the energy storage material, which stores thermal energy in a solid state, changes phase to a liquid state in which thermal energy can be retrieved by heat transfer conduction through the crucible side wall and into the fluid flow circuit thereby heating the fluid therein, wherein the material of the crucible consists of 50 to 100% by mass of hexagonal boron nitride, which crucible material is configured to have a coefficient of thermal expansion (CTE) that is less than $3 \times 10^{-6}$ $C^{-1}$, and wherein the CTE of the crucible material is less than the CTE of the energy storage material across a temperature range of 25-1500° C., and wherein the crucible material comprises a layered 2-dimensional structure defining an A-B plane and a C-axis perpendicular to the A-B plane, wherein the crucible is constructed so as to orient the A-B plane across the width of the side walls and substantially in the direction of heat transfer conduction through the crucible to improve heat energy conduction through the crucible side walls.

2. The device claimed in claim 1, wherein the CTE of the crucible material is less than $2 \times 10^{-6}$ $C^{-1}$ at 25-1500° C.

3. The device claimed in claim 1, wherein the crucible has a thermal conductivity of 100-750 W/mK at temperature of 25° C.

4. The device claimed in claim 1, wherein the fluid flow circuit contains a recirculating carrier fluid comprising a cold fluid channel and a hot fluid channel.

5. The device claimed in claim 4, wherein the fluid flow circuit is connectable to an energy recovery system that receives heated carrier fluid from the fluid circuit outlet, transfers heat from the energy carrier fluid and returns cooled fluid to the fluid circuit inlet, thereby forming a closed loop fluid flow circuit.

6. The device claimed in claim 4, wherein the hot fluid channel is positioned horizontally adjacent relative to the crucible.

7. The device claimed in claim 6, wherein fluid flows in an upwardly direction in the hot fluid channel relative to the crucible bottom wall.

8. The device claimed in claim 4, including a valve at the hot fluid channel to regulate the flow of heated fluid out of the hot fluid channel.

9. The device claimed in claim 4, wherein the fluid flow circuit comprises a closed loop gas path circulating around inner and outer walls of the thermal insulation intermediate.

10. The device claimed in claim 9, wherein the cold fluid channel flows along the outer wall of the thermal insulation intermediate, and the hot fluid channel flows along the inner wall of the thermal insulation intermediate.

11. The device claimed in claim 1, including a plurality of thermal chambers positioned to receive heated fluid from the hot fluid channel and communicate cooled fluid to the cold fluid channel, wherein the thermal chambers are configured to either be connected to a heat exchanger or to house a heat exchanger.

12. A method of converting, storing and retrieving energy, comprising:

powering a heat generator with electrical energy to heat a thermal energy storage material contained in a susceptor crucible encased in a thermal housing thereby converting electrical energy into thermal energy, the heat generator including an induction coil embedded in a thermal insulation intermediate contained in the thermal housing and which induction coil vertically surrounds at least part of the susceptor crucible;

storing the thermal energy in the energy storage material contained in the susceptor crucible, wherein the energy storage material is heated to change phases from a solid state to a liquid state and consists of 95 to 100 mass % silicon, and 0 to 5 mass % silicon carbide and/or boron, and the susceptor crucible has a bottom wall and one or more side walls extending upwardly from the bottom wall at an at an angle of between 90 to 145° to the bottom wall to be non wetting to the energy storage material; and retrieving the stored thermal energy by conducting thermal energy through a side wall of the crucible to transfer to a fluid circulating in a regulated fluid flow circuit, wherein the material of the crucible consists of 50 to 100% by mass of hexagonal boron nitride and is configured to have a coefficient of thermal expansion (CTE) that is less than $3\times10^{-6}$ $C^{-1}$, and wherein the CTE of the crucible material is less than the CTE of the energy storage material across a temperature range of 25-1500° C., and wherein the crucible material comprises a layered 2-dimensional structure defining an A-B plane and a C-axis perpendicular to the A-B plane, and wherein the crucible is constructed so as to orient the A-B plane across the width of the side walls and substantially in the direction of heat transfer conduction through the crucible to improve heat energy conduction through the crucible side walls.

13. The method claimed in claim 12, including powering induction coils to generate energy to heat the energy storage material directly or indirectly.

* * * * *